(12) United States Patent
Fackler et al.

(10) Patent No.: US 7,920,947 B2
(45) Date of Patent: Apr. 5, 2011

(54) APPARATUS AND METHOD PROVIDING A PROPULSION SAFEING SUB-SYSTEM IN AN AGRICULTURAL WINDROWER

(75) Inventors: Robert L. Fackler, Ephrata, PA (US);
Christoper A. Foster, Akron, PA (US);
Mark K. Chow, Paoli, PA (US);
Richard P. Strosser, Akron, PA (US)

(73) Assignee: CNH America LLC, New Holland, PA (US)

(*) Notice: Subject to any disclaimer, the term of this patent is extended or adjusted under 35 U.S.C. 154(b) by 1205 days.

(21) Appl. No.: 11/486,496

(22) Filed: Jul. 14, 2006

(65) Prior Publication Data

US 2007/0027601 A1    Feb. 1, 2007

Related U.S. Application Data

(60) Provisional application No. 60/699,943, filed on Jul. 16, 2005.

(51) Int. Cl.
*G06F 7/70* (2006.01)
(52) U.S. Cl. .......................................................... 701/50
(58) Field of Classification Search .................... 701/51; 56/10.8, 10.2 A, 15.1, 15.5, 16.3, 10.2 R; 60/413
See application file for complete search history.

(56) References Cited

U.S. PATENT DOCUMENTS

| | | | |
|---|---|---|---|
| 4,398,618 A | 8/1983 | Hansen | 180/273 |
| 5,784,883 A * | 7/1998 | Ohkura et al. | 60/327 |
| 6,202,016 B1 | 3/2001 | Stephenson et al. | 701/51 |
| 6,411,879 B2 * | 6/2002 | Kupper et al. | 701/51 |
| 6,480,780 B1 * | 11/2002 | Schwamm | 701/100 |
| 6,901,729 B1 | 6/2005 | Otto et al. | 56/208 |
| 2002/0116099 A1 * | 8/2002 | Tabata et al. | 701/22 |
| 2002/0178593 A1 * | 12/2002 | Kuru | 33/1 PT |
| 2003/0014172 A1 * | 1/2003 | Burgart et al. | 701/51 |
| 2004/0044448 A1 * | 3/2004 | Ramaswamy et al. | 701/22 |
| 2004/0098182 A1 * | 5/2004 | Schafer et al. | 701/51 |
| 2004/0255706 A1 | 12/2004 | Bulgrien | 74/335 |
| 2004/0260451 A1 * | 12/2004 | Kumar et al. | 701/104 |
| 2005/0065689 A1 | 3/2005 | Budde et al. | 701/50 |
| 2005/0199215 A1 * | 9/2005 | Nakamoto et al. | 123/395 |
| 2006/0282205 A1 * | 12/2006 | Lange | 701/50 |
| 2006/0289205 A1 * | 12/2006 | Law et al. | 175/40 |

* cited by examiner

*Primary Examiner* — Khoi Tran
*Assistant Examiner* — Rodney King
(74) *Attorney, Agent, or Firm* — Patrick M. Sheldrake; Michael G. Harms

(57) ABSTRACT

Apparatus and a method for monitoring the performance of control algorithms, providing a safeing subsystem for a vehicle, particularly an agricultural windrower, for determining when a controlled system such as the propulsion system is no longer tracking a reference input signal sufficiently well. An appropriate action can then be executed, such as outputting a fault signal and/or shutting down the controlled system. An exponentially decaying integrator can be used to monitor the tracking errors.

16 Claims, 41 Drawing Sheets

```
1  /*
        MODULE:         PropFault.rps2005jan011102.c
        DESCRIPTION:
5       OPEN ISSUES:
        REVISION HISTORY:
10      cfoster2004Nov081402 001 Module created
   */
   // Include Files:
15     #include <reg167.h>
       #include <stdlib.h>
       #include "bin.h"
       #include "can1_out.h"
       #include "can1_recv.h"
20     #include "changes.h"
       #include "disppid.h"
       #include "Engine.h"
       #include "fault_log.h"
       #include "fnr.h"
25     #include "hsd.h"
       #include "iomap_appl.h"
       #include "Park_Brake.h"
       #include "PropSafe.h"
       #include "propulsion.h"
30     #include "propuls_icntrl.h"
       #include "Steering_shaft.h"
       #include "sys_vars.h"
       #include "timer.h"
       #include "warning.h"
35  /****************
        DEFINITIONS
    ****************/
40  //CONSTANT
       #define    _PROPCYL_DECAY_RATE_B8       value_b8_ui( 0.99 )
       #define    _PROPICNTRL_DECAY_RATE_B8    value_b8_ui( 0.98 )
       #define    _TSAMP_B9                    value_b9_ui( 5.12 )

45  //ENUMERATIONS
       enum _propfault_states
       (
            _state_prop_disabled,           //state 0
            _state_prop_enabled,            //state 1
50          _state2,                        //state 2
            _state3                         //state 3
```

```
55   /****************
     MAPPING
     ****************/

//Map Inputs: Positive Logic...ON = non-zero...OFF = 0.

60   //Map Outputs:

/****************
     FUNCITON PROTOYPES
     ****************/
65   unsigned long _propcyl_tracking_monitor( signed int, unsigned long );
     unsigned long _propicntrl_tracking_monitor( signed int, unsigned long );

void propfault_main( void );
     void propfault_init( void );

70   static void _R18_fault_detect( void );
     static void _R23_fault_detect( void );
     static void _cyl_extents_fault_detect( void );
     static void _mfh_cyl_pos_mismatch( void );

75   /****************
     VARIABLES
     ****************/
     //Global Variables
80   signed char propfault_state_b0_uc;

//Local Variables:
     unsigned int   _propicntrl_decayinteg_b8_ui, _propcyl_decayinteg_b8_ui;
     signed int     _temp_cylpos_err_b12, _temp_i_err_b3;
85   unsigned int   _propicntrl_decayinteg_pk_b8_ui = 0;
     unsigned int   _propcyl_decayinteg_pk_b8_ui = 0;

enum _states
90   (
        _state_b0_ui_INIT,
        _state_b0_ui_INTEGRATE
     );
        static unsigned char _state_b0_uc;
95   static signed int _prev_cylpos_in_b12_si;
     static signed int _prev_setpt_in_b12_si;
     static unsigned int _timer_01;

100  /*******************************************************/
     void propfault_init( void )
     (
```

```
        propfault_state_b0_uc = _state_prop_disabled;

105     //initialise integrators
        _propcyl_decayinteg_b8_ui = 0;
        _propicntrl_decayinteg_b8_ui = 0;

_state_b0_uc = _state_b0_ui_INIT;
        _prev_cylpos_in_b12_si = propfault_cylpos_in_b12_si;
110     if( mfh_R18_v_b11_ui_w_errors_returned() < 0xfb00 )    // if pot reading not out of range
          _prev_setpt_in_b12_si = ( _fnr_v_b11_si_to_distance_d_b12_si( mfh_R18_v_b11_ui_w_errors_returned() ) );
        else
115       _prev_setpt_in_b12_si = 0;
        )

/***********************************************************/
        void propfault_main( void )
120     (
        /*
         * Description: Main state control for Propulsion Fault Detection Sub-System.
         */
        static signed int __prior_cylpos_in_b12_si;

125     _R18_fault_detect();

_R23_fault_detect();

130     _cyl_extents_fault_detect();
        _mfh_cyl_pos_mismatch();

//initially disable propulsion
135     propfault_state_b0_uc = _state_prop_disabled;

//evalutate performance of control loops using tracking monitor

/*
140     Can we reduce this to (1) simple cases...where the cylinder exceeds the setpoint...vehicle is accelerating...t
        relative to neutral. So we should look for the cylinder moving to the extents, while the set point is exceede This algorithm will lock out propulsion, given the vehicle accelerates beyond the commanded setpoint, due to e 145     Add (2) additional tests...check for rapid change of MFH pot and rapid change of Cylinder Pot....
        */
        if
        (
150       //Set point is >= 0 and cylinder position is <= set point position and cylinder position is >= to 0
          (
             propfault_setpt_in_b12_si >= disp_in_b12_si( 0.000 )
             && propfault_cylpos_in_b12_si <= propfault_setpt_in_b12_si
             && propfault_cylpos_in_b12_si >= disp_in_b12_si( 0.000 )
```

Fig. 10

```
155     ) //Set point is < 0 and cylinder position is > set point position and cylinder position is <=.to 0
        || ( propfault_setpt_in_b12_si < disp_in_b12_si( 0.000 )
            && propfault_cylpos_in_b12_si > propfault_setpt_in_b12_si
            && propfault_cylpos_in_b12_si < disp_in_b12_si( 0.000 )
        )

160     _state_b0_uc = _state_b0_ui_INIT;
        )
        switch( _state_b0_uc )
        (
165     case _state_b0_ui_INIT:
        _propcyl_decayinteg_b8_ui = 0;

170     //Cylinder position is on the same side as the setpoint position and the cylinder position exceeds
        if
        (
            ( propfault_setpt_in_b12_si > disp_in_b12_si( 0.000 )
175           && propfault_cylpos_in_b12_si > propfault_setpt_in_b12_si
            )
            ||
            ( propfault_setpt_in_b12_si < disp_in_b12_si( 0.000 )
180           && propfault_cylpos_in_b12_si < propfault_setpt_in_b12_si
            )
        ) //Cylinder position is on the opposite side of the set point position
        ||
        (
            ( propfault_setpt_in_b12_si > disp_in_b12_si( 0.000 )
185           && propfault_cylpos_in_b12_si < disp_in_b12_si( 0.000 )
            )
            ||
            ( propfault_setpt_in_b12_si < disp_in_b12_si( 0.000 )
190           && propfault_cylpos_in_b12_si > disp_in_b12_si( 0.000 )
            )
        )
        (
            _prior_cylpos_in_b12_si = propfault_cylpos_in_b12_si;
            _state_b0_uc = _state_b0_ui_INTEGRATE;         //update the curr
        )                                                   //next state
195     break;
        case _state_b0_ui_INTEGRATE:
        if( abs(propfault_cylpos_in_b12_si) > abs(_prior_cylpos_in_b12_si) )
        (
            _propcyl_decayinteg_b8_ui
200         = _propcyl_tracking_monitor                    //compute perf
                (
                    abs(propfault_cylpos_in_b12_si) - abs(_prior_cylpos_in_b12_si),
```

*Fig. 11*

```
205                      __propcyl_decayinteg_b8_ui
                         );
             else
             (
210                      __propcyl_decayinteg_b8_ui                                              //compute perf
                         = __propcyl_tracking_monitor(
                                 0,
                                 __propcyl_decayinteg_b8_ui
                         );
215                      __prior_cylpos_in_b12_si = propfault_cylpos_in_b12_si;                  //update the curr
             )
             break;

220      __propcyl_decayinteg_b8_ui = __propcyl_tracking_monitor(propfault_i_err_b3, __propcntrl_decayinteg_b8_ui);

//decide whether or not cylinder position control still tracking sufficiently well
         if( ( __propcyl_decayinteg_b8_ui < value_b8_ui( 5.500 ) )
225          && ( __propcntrl_decayinteg_b8_ui < value_b8_ui( 62.500 ) ) )
         (
             propfault_state_b0_uc = _state_prop_enabled;
         else
         (
230          propsafe_disable_propulsion();                                  //Disable Propulsion System...Cut power to the if( __propcyl_decayinteg_b8_ui >= value_b8_ui( 5.500 ) )        //Position Tracking exceeded limit
                 fault_log_add_fault( _F434_03 );
             else
235              fault_log_add_fault( _F433_03 );                            //Current Tracking exceeded limit
         } ifdef engr_data_acq_PROP_FAULT  //rps2004jan061125
                 //Engr. Test Data
240      CAN_test_data2[0].word = propfault_setpt_in_b12_si;
         CAN_test_data2[1].word = propfault_cylpos_in_b12_si;
         CAN_test_data2[2].word = __propcyl_decayinteg_b8_ui;
         CAN_test_data2[3].word = __prior_cylpos_in_b12_si;
         #endif
245      )

/****************************************************************************/
250      unsigned long __propcyl_tracking_monitor(signed int __pcylpos_error_b12, unsigned long __old_pcyl_integ_b8)
         (
         /*
          * This function calculates an exponentially decaying integrator of absolute cylinder position tracking errors
          */
255      unsigned long __pcyl_integ_b8;
```

Fig. 12

```c
        _pcyl_integ_b8 = (unsigned long)(abs(_pcylpos_error_b12)>>4) + (unsigned long)((_PROPCYL_DECAY_RATE_B8*_old
260     if( _pcyl_integ_b8 > _propcyl_decayinteg_pk_b8_ui )
            _propcyl_decayinteg_pk_b8_ui = _pcyl_integ_b8;

return(_pcyl_integ_b8);
265 }
    /*********************************************************************************/
    unsigned long _propicntrl_tracking_monitor(signed int _pi_error_b3, unsigned long _old_picntrl_integ_b8)
    {
    /*
270  * This function calculates an exponentially decaying integrator of absolute valve current tracking errors
     */
        unsigned long _picntrl_integ_b8;

_picntrl_integ_b8 = (unsigned long)(abs(_pi_error_b3)>>4) + (unsigned long)((_PROPICNTRL_DECAY_RATE_B8*_old
275     if( _picntrl_integ_b8 > _propicntrl_decayinteg_pk_b8_ui )
            _propicntrl_decayinteg_pk_b8_ui = _picntrl_integ_b8;

return(_picntrl_integ_b8);
280 }
    /*********************************************************************************/
    static void _R18_fault_detect( void )
285 {
    /*
     * Description: Check for rapid transition of R18 signal that would cause vehicle acceleration
     * Assume the FNR can move from full forward to Neutral in 125ms...dv/dt ~= 1.5/0.125 = 12V/sec = 120mV/10ms
     * Qualify this and ignore fast decel's
290  */
        signed int _setpt_in_b12_si;

if( mfh_R18_v_b11_ui_w_errors_returned() < 0xfb00 )                // if pot reading not out of range
            _setpt_in_b12_si = ( _fnr_v_b11_si_to_distance_d_b12_si( mfh_R18_v_b11_ui_w_errors_returned() ) );
295     else
            return;

if( _setpt_in_b12_si > disp_in_b12_si( 0.000 ) )                   // if going in forward
300     {
            if
            (
                abs( _setpt_in_b12_si - _prev_setpt_in_b12_si )
                > disp_in_b12_si( 1.000 )
            )
305     {
            fault_log_add_fault( _F432_03 );                               //MFH forward velocity exceeded limit
```

Fig. 13

```
       propulsion_ESTOP_state_machine_start();
    )
310 else if( _setpt_in_b12_si < disp_in_b12_si( 0.000 ) )    // else if going in reverse
    (
       if
       (
315       abs( _setpt_in_b12_si - _prev_setpt_in_b12_si )
          > disp_in_b12_si( 0.500 )                            //MFH reverse velocity exceeded limit
       )
       (
          fault_log_add_fault( _F431_03 );
          propulsion_ESTOP_state_machine_start();
320    )
    )
    _prev_setpt_in_b12_si = _setpt_in_b12_si;
}
325 /***************************************************************/
    static void _R23_fault_detect( void )
    /*
330 Description: Check for rapid transition of R23 signal
    Assume the cylinder can move from full forward to neutral in 1sec...ds/dt -=2/1 = 2in/sec = .02in/10ms
    */
    if
    (
335    abs(propfault_cylpos_in_b12_si - prev_cylpos_in_b12_si)
       > disp_in_b12_si( 0.200 )
    )
    (
       fault_log_add_fault( _F430_03 );   //Propulsion Cylinder Velocity exceeded limit
340    propsafe_disable_propulsion();      //Disable Propulsion System...Cut power to the Supply Rails!!!
    )
    _prev_cylpos_in_b12_si = propfault_cylpos_in_b12_si;
}
345 /***************************************************************/
    static void _cyl_extents_fault_detect( void )
    (
350 /* Description: Check R23 signal stuck at extents
    */
    if
    (
355    abs( propfault_setpt_in_b12_si )
       < disp_in_b12_si( 0.100 )
    )
```

Fig. 14

```
360     if( _timer_01 >= _time_b0_ui2scans_sec_f( 0.200 ) )
        {
            if( propfault_cylpos_in_b12_si > disp_in_b12_si( 1.950 ) )
            {
                fault_log_add_fault( _F429_03 ); //Prop Cylinder stuck at forward extent or moving very slowly from fo
                propsafe_disable_propulsion();   //Disable Propulsion System...Cut power to the Supply Rails!!!
            }
365         if( propfault_cylpos_in_b12_si < disp_in_b12_si( -0.950 ) )
            {
                fault_log_add_fault( _F428_03 ); //Prop Cylinder stuck at reverse extent or moving very slowly from re
                propsafe_disable_propulsion();   //Disable Propulsion System...Cut power to the Supply Rails!!!
            }
370     }
        else
            ++_timer_01;
        }
375     else
            _timer_01 = 0;
    }

380 /********************************************************************/
    static void _mfh_cyl_pos_mismatch( void )
    {
    /*
        Description:  If Prop Cylinder( R23A ) is in the forward range and the Ground Speed is set for High Range and
                      the Prop Cylinder( R23A ) position by 0.1", than disable the Park Brake Active Destroke.
385 */
        signed int __setpt_in_b12_si;

390     if( mfh_R18_v_b11_ui_w_errors_returned() < 0xfb00 )                    // if pot reading not out of range
            __setpt_in_b12_si = ( _fnr_v_b11_si_to_distance_d_b12_si( mfh_R18_v_b11_ui_w_errors_returned() ) );
        else
            set_prop_cyl_too_sluggish_bt();
395     if
        (
            propfault_cylpos_in_b12_si > disp_in_b12_si( 0.000 )
            && ( propfault_cylpos_in_b12_si - __setpt_in_b12_si ) > disp_in_b12_si( 0.100 )
400     )
            set_prop_cyl_too_sluggish_bt();
    }
```

*Fig. 15*

```
1  /*
       MODULE:              FNR.c

DESCRIPTION:

5      OPEN ISSUES:

REVISION HISTORY:

10     rfackler2005Jan17         Restructured
       rfackler2004Dec03         Restructured
       jpeters2004Jun030914      Restructured with machine mode
       jpeters2003Aug111422      Module created
   */
15
   #include "alarm.h"
   #include "bin.h"
   #include "can1_out.h"
20 #include "changes.h"
   #include "fault_log.h"
   #include "fnr.h"
   #include "fox.h"
   #include "iomap_appl.h"
25 #include "Menu.h"
   #include "Park_brake.h"
   #include "Propulsion.h"
   #include "Sys_vars.h"
   #include "Timer.h"
30 /******************
       DEFINITIONS
   ******************/

35 // CONSTANT define   EE_MFH_FULL_FWD_FAULT_MASK              0x01
       #define   EE_MFH_FWD_GOING_OUT_SW_PT_FAULT_MASK   0x02
       #define   EE_MFH_FWD_COMING_BACK_SW_PT_FAULT_MASK 0x04
       #define   EE_MFH_REV_GOING_OUT_SW_PT_FAULT_MASK   0x08
40     #define   EE_MFH_REV_COMING_BACK_SW_PT_FAULT_MASK 0x10
       #define   EE_MFH_FULL_REV_FAULT_MASK              0x20

// Mar 03 2005 - statistical data from Belleville
   // Mean      sd      3sd     4sd     label
45 // 1.116    0.058   0.173   0.230   ee_fnr_full_fwd_v_bll_ui
   // 3.544    0.059   0.178   0.238   ee_fnr_full_rev_v_bll_ui
   // 2.371    0.049   0.146   0.195   ee_mfh_fwd_swpoint_going_out_v_bll_ui
   // 2.383    0.048   0.144   0.192   ee_mfh_fwd_swpoint_coming_back_v_bll_ui
   // 2.624    0.053   0.160   0.213   ee_mfh_rev_swpoint_coming_back_v_bll_ui
50 // 2.638    0.051   0.152   0.203   ee_mfh_rev_swpoint_going_out_v_bll_ui
```

Fig. 16

```
// R18 - DELUXE MACHINE MFH LEVER POTENTIOMETER
#define R18_CALCHK_MFH_FWD_NOM_V_B11_UI          ( volts_v_b11_ui( 1.115 ) )
#define R18_CALCHK_4SIGMA_DEV_FWD_V_B11_UI       ( volts_v_b11_ui( 0.230 ) )
#define R18_CALCHK_MFH_FWD_MIN_V_B11_UI          ( R18_CALCHK_MFH_FWD_NOM_V_B11_UI - R18_CALCHK_4SI    // 0.886 to 1.346
define R18_CALCHK_MFH_FWD_MAX_V_B11_UI          ( R18_CALCHK_MFH_FWD_NOM_V_B11_UI + R18_CALCHK_4SI define R18_CALCHK_MFH_REV_NOM_V_B11_UI          ( volts_v_b11_ui( 3.544 ) )
define R18_CALCHK_4SIGMA_DEV_REV_V_B11_UI       ( volts_v_b11_ui( 0.238 ) )
#define R18_CALCHK_MFH_REV_MIN_V_B11_UI          ( R18_CALCHK_MFH_REV_NOM_V_B11_UI - R18_CALCHK_4SI    // 3.306 to 3.782
define R18_CALCHK_MFH_REV_MAX_V_B11_UI          ( R18_CALCHK_MFH_REV_NOM_V_B11_UI + R18_CALCHK_4SI define R18_MFH_ABSOLUTE_MIN_V_B11_UI            ( R18_CALCHK_MFH_FWD_MIN_V_B11_UI - ( volts_v_b11_
define R18_MFH_ABSOLUTE_MAX_V_B11_UI            ( R18_CALCHK_MFH_REV_MAX_V_B11_UI + ( volts_v_b11_

// S03 - DELUXE MACHINE MFH LEVER NEUTRAL SWITCH
#define S03_MFH_FWD_SWPOINT_GOING_OUT_NOM_V_B11_UI       ( volts_v_b11_ui( 2.371 ) )
#define S03_4SIGMA_FWD_SWPOINT_GOING_OUT_DEV_V_B11_UI    ( volts_v_b11_ui( 0.195 ) )                  // 2.176 to 2.566
#define S03_MFH_FWD_SWPOINT_GOING_OUT_MIN_V_B11_UI       ( S03_MFH_FWD_SWPOINT_GOING_OUT_NOM_V_B11_UI - S03
define S03_MFH_FWD_SWPOINT_GOING_OUT_MAX_V_B11_UI       ( S03_MFH_FWD_SWPOINT_GOING_OUT_NOM_V_B11_UI + S03 define S03_MFH_FWD_SWPOINT_COMING_BACK_NOM_V_B11_UI     ( volts_v_b11_ui( 2.383 ) )
define S03_4SIGMA_FWD_SWPOINT_COMING_BACK_DEV_V_B11_UI  ( volts_v_b11_ui( 0.192 ) )                  // 2.191 to 2.575
#define S03_MFH_FWD_SWPOINT_COMING_BACK_MIN_V_B11_UI     ( S03_MFH_FWD_SWPOINT_COMING_BACK_NOM_V_B11_UI - S
define S03_MFH_FWD_SWPOINT_COMING_BACK_MAX_V_B11_UI     ( S03_MFH_FWD_SWPOINT_COMING_BACK_NOM_V_B11_UI + S define S03_MFH_REV_SWPOINT_COMING_BACK_NOM_V_B11_UI     ( volts_v_b11_ui( 2.624 ) )
define S03_4SIGMA_REV_SWPOINT_COMING_BACK_DEV_V_B11_UI  ( volts_v_b11_ui( 0.213 ) )                  // 2.411 to 2.837
#define S03_MFH_REV_SWPOINT_COMING_BACK_MIN_V_B11_UI     ( S03_MFH_REV_SWPOINT_COMING_BACK_NOM_V_B11_UI - S
define S03_MFH_REV_SWPOINT_COMING_BACK_MAX_V_B11_UI     ( S03_MFH_REV_SWPOINT_COMING_BACK_NOM_V_B11_UI + S define S03_MFH_REV_SWPOINT_GOING_OUT_NOM_V_B11_UI       ( volts_v_b11_ui( 2.638 ) )
define S03_4SIGMA_REV_SWPOINT_GOING_OUT_DEV_V_B11_UI    ( volts_v_b11_ui( 0.203 ) )                  // 2.435 to 2.841
#define S03_MFH_REV_SWPOINT_GOING_OUT_MIN_V_B11_UI       ( S03_MFH_REV_SWPOINT_GOING_OUT_NOM_V_B11_UI - S03
define S03_MFH_REV_SWPOINT_GOING_OUT_MAX_V_B11_UI       ( S03_MFH_REV_SWPOINT_GOING_OUT_NOM_V_B11_UI + S03 define S03_CALCHK_VOLTS_BETWEEN_SWPOINTS_NOM_V_B11_UI   ( volts_v_b11_ui( 0.253 ) )                  // ((2.638+2.622)
define S03_CALCHK_6SIGMA_DEV_BETWEEN_SWPOINTS_V_B11_UI  ( volts_v_b11_ui( 0.072 ) )
#define S03_CALCHK_VOLTS_BETWEEN_SWPOINTS_MIN_V_B11_UI   ( S03_CALCHK_VOLTS_BETWEEN_SWPOINTS_NOM_V_B11_UI -
#define S03_CALCHK_VOLTS_BETWEEN_SWPOINTS_MAX_V_B11_UI   ( S03_CALCHK_VOLTS_BETWEEN_SWPOINTS_NOM_V_B11_UI +

// ENUMERATIONS enum _fnr_cal_states( WAIT_4_MENU_START_ACTION, MFH_CAL_EXIT, MFH_CAL_EXIT_KEYOFF_IDLE, MFH_CAL_TERMINATE
    WANT_PARK_BRAKE_DISENGAGED, TEST_4_MFH_IN_NEUTRAL, GET_THE_RELAY_UNLATCHED,
    GOING_REARWARD_2_SEE_S03_TRANSITION, GOING_FULLY_REARWARD_WAIT_FOR_OK,
    HAS_PRESSED_OK_AT_FULLY_REARWARD, BACK_2_NEUTRAL_2_SEE_S03_TRANSITION, TEST_4_REL
    TEST_4_MFH_IN_NEUTRALL, GET_THE_RELAY_UNLATCHEDD, GOING_FORWARD_AND_SEE_S03_TRANS
    GOING_FULLY_FORWARD_WAIT_FOR_OK, HAS_PRESSED_OK_AT_FULLY_FORWARD,
    BACK_2_NEUTRAL_2_SEE_S03_TRANSITIONN, TEST_4_RELAY_UNLATCHH,
    FULLY_NEUTRAL_WAIT_FOR_OK, FINAL_VERIFICATION, MFH_CAL_FAILED
```

```
105     // UNITS

// MESSAGES

110     /*****************
        MAPPING
        *****************/

115     // INPUTS: DIGITAL - POSITIVE LOGIC...ON = NON-ZERO...OFF = 0.

// INPUTS: ANALOG

120     // OUTPUTS: DIGITAL - POSITIVE LOGIC...ON = NON-ZERO...OFF = 0.

// OUTPUTS: PWM TYPE

/*****************
        VARIABLES
        *****************/
125     // GLOBAL SCOPE

// MODULE SCOPE
130     static _bit            _fault_F404_set_flag_bt;
        static _bit            _mfh_validation_problem_bt;
        static _bit            _mfh_is_out_of_neutral_bt;
        static _bit            _mfh_is_back_into_neutral_bt;
        static unsigned char   _interactive_cal_proceed_flag_b0_uc;
        static unsigned int    _prev_mfh_cal_state_b0_ui, _timer02_ui, _mfh_R18_v_b11_ui_w_error;
135     static enum            fnr_cal_states  _mfh_cal_state_b0_ui;
        static unsigned char   _mfh_ee_validation_status_b0_uc;

/*****************
        FUNCTION PROTOTYPING - GLOBAL SCOPE
140     *****************/
        static   void          mfh_R18_S03_calibration(void);

/*********************************************************************/
145     void mfh_ee_validation( void )
        {
        /*
            Need to store these as unsigned ints (with offset) and then after they are recalled
            the user module will remove the offset and use it as a signed int. If there is a problem with any of these 4
150         registers we want to change the out-of-bounds register to 0xfe00 and have this function return a value other t
            Then the main state machine should hang up in the CRITICAL_EE_VARS_OUT_OF_BOUNDS state which will force a reca
            strategy.
        */
```

```
155    _mfh_ee_validation_status_b0_uc = 0;              // means we're OK - good to go if( deluxe_model_b_xp )                           // economy machines do not have a M
       {
         _mfh_ee_validation_status_b0_uc = 0;

160      if( (ee_fnr_full_fwd_v_bll_ui > R18_CALCHK_MFH_FWD_MAX_V_B11_UI )
          || (ee_fnr_full_fwd_v_bll_ui < R18_CALCHK_MFH_FWD_MIN_V_B11_UI )
         )
         {
165        fault_log_add_fault( _F418_13 );              // error - "UNCALIBRATED"
           _mfh_ee_validation_status_b0_uc |= EE_MFH_FULL_FWD_FAULT_MASK;
           ee_fnr_full_fwd_v_bll_ui = 0xfc00;            // error - "UNCALIBRATED"
         }
         else
170        _mfh_ee_validation_status_b0_uc &= ~EE_MFH_FULL_FWD_FAULT_MASK;

if( (ee_mfh_fwd_swpoint_going_out_v_bll_ui > S03_MFH_FWD_SWPOINT_GOING_OUT_MAX_V_B11_UI )
          || (ee_mfh_fwd_swpoint_going_out_v_bll_ui < S03_MFH_FWD_SWPOINT_GOING_OUT_MIN_V_B11_UI )
         )
175      {
           fault_log_add_fault( _F419_13 );              // error - "UNCALIBRATED"
           _mfh_ee_validation_status_b0_uc |= EE_MFH_FWD_GOING_OUT_SW_PT_FAULT_MASK;
           ee_mfh_fwd_swpoint_going_out_v_bll_ui = 0xfc00;
         }
180      else
           _mfh_ee_validation_status_b0_uc &= ~EE_MFH_FWD_GOING_OUT_SW_PT_FAULT_MASK;

if( (ee_mfh_fwd_swpoint_coming_back_v_bll_ui > S03_MFH_FWD_SWPOINT_COMING_BACK_MAX_V_B11_UI )
          || (ee_mfh_fwd_swpoint_coming_back_v_bll_ui < S03_MFH_FWD_SWPOINT_COMING_BACK_MIN_V_B11_UI )
185      )
         {
           fault_log_add_fault( _F419_13 );              // error - "UNCALIBRATED"
           _mfh_ee_validation_status_b0_uc |= EE_MFH_FWD_COMING_BACK_SW_PT_FAULT_MASK;
           ee_mfh_fwd_swpoint_coming_back_v_bll_ui = 0xfc00;
190      }
         else
           _mfh_ee_validation_status_b0_uc &= ~EE_MFH_FWD_COMING_BACK_SW_PT_FAULT_MASK;

if( (ee_mfh_rev_swpoint_coming_back_v_bll_ui > S03_MFH_REV_SWPOINT_COMING_BACK_MAX_V_B11_UI )
195       || (ee_mfh_rev_swpoint_coming_back_v_bll_ui < S03_MFH_REV_SWPOINT_COMING_BACK_MIN_V_B11_UI )
         )
         {
           fault_log_add_fault( _F420_13 );              // error - "UNCALIBRATED"
           _mfh_ee_validation_status_b0_uc |= EE_MFH_REV_COMING_BACK_SW_PT_FAULT_MASK;
200        ee_mfh_rev_swpoint_going_out_v_bll_ui = 0xfc00;
         }
         else
           _mfh_ee_validation_status_b0_uc &= ~EE_MFH_REV_COMING_BACK_SW_PT_FAULT_MASK;
```

```c
205     if(   (ee_mfh_rev_swpoint_going_out_v_b11_ui > S03_MFH_REV_SWPOINT_GOING_OUT_MAX_V_B11_UI )
           || (ee_mfh_rev_swpoint_going_out_v_b11_ui < S03_MFH_REV_SWPOINT_GOING_OUT_MIN_V_B11_UI )
          )
        {
          fault_log_add_fault( _F420_13 );                                    // error - "UNCALIBRATED"
210       _mfh_ee_validation_status_b0_uc |= EE_MFH_REV_GOING_OUT_SW_PT_FAULT_MASK;
          ee_mfh_rev_swpoint_going_out_v_b11_ui = 0xfc00;                     // error - "UNCALIBRATED"
        }
        else
          _mfh_ee_validation_status_b0_uc &= ~EE_MFH_REV_GOING_OUT_SW_PT_FAULT_MASK;

215     if(   (ee_fnr_full_rev_v_b11_ui > R18_CALCHK_MFH_REV_MAX_V_B11_UI )
           || (ee_fnr_full_rev_v_b11_ui < R18_CALCHK_MFH_REV_MIN_V_B11_UI )
          )
        {
          fault_log_add_fault( _F421_13 );                                    // error - "UNCALIBRATED"
220       _mfh_ee_validation_status_b0_uc |= EE_MFH_FULL_REV_FAULT_MASK;
          ee_fnr_full_rev_v_b11_ui = 0xfc00;                                  // error - "UNCALIBRATED"
        }
        else
225       _mfh_ee_validation_status_b0_uc &= ~EE_MFH_FULL_REV_FAULT_MASK;
      }

/*************************************************************/
230   void mfh_validation_init( void )
      {
235     if( _mfh_ee_validation_status_b0_uc )        // if this is not zero
          _mfh_validation_problem_bt = TRUE;         // then there was a problwm
        else
          _mfh_validation_problem_bt = FALSE;        // otherwise it looks good 240     _fault_F404_set_flag_bt = 0;
      }

/*************************************************************/
245   bit  mfh_initialization_problem_b_xp( void )
      {
        return( _mfh_validation_problem_bt );
250   }

/*************************************************************/
      unsigned int mfh_position_R18_v_b11_ui( void )
      {
255     return( AtoD_b0_ui_to_v_b11_ui( iomap_anin_R18_fnr_handle_position.raw ) );   // voltage - no error testing do
```

```
/*******************************************************************/
260  void mfh_position_R18_v_b11_ui_w_errors( void )
     {
     /*
      Description: Get R18 MFH handle potentiometer value and test if outside of operating voltage limits
265  This is the one that is to be called ONLY ONCE per scan by WR_appl_functions_main()
     */
     // use calibration points as the test for extents... add 150mv for buffer
     #define R18_MFH_RUNTIME_MIN_V_B11_UI    ( ee_fnr_full_fwd_v_b11_ui - volts_v_b11_ui( 0.150 ) )
     #define R18_MFH_RUNTIME_MAX_V_B11_UI    ( ee_fnr_full_rev_v_b11_ui + volts_v_b11_ui( 0.150 ) )

270  _mfh_R18_v_b11_ui_w_error = AtoD_b0_ui_to_v_b11_ui( iomap_anin_R18_fnr_handle_position.raw );   // voltage - n
     _mfh_is_back_into_neutral_bt = _mfh_is_out_of_neutral_bt = FALSE;              // clr these each scan // Test for MFH pot reading being out of range
275  if( _mfh_R18_v_b11_ui_w_error < R18_MFH_RUNTIME_MIN_V_B11_UI )  //R-18 Pot voltage should always fall between h
     {
        if( !_fault_F404_set_flag_bt )
            fault_log_add_fault( _F404_04 );

280     _fault_F404_set_flag_bt = TRUE;
        _mfh_R18_v_b11_ui_w_error = 0xfb00;                                  // reset to 'voltage below normal or shorted
        propulsion_ESTOP_state_machine_start();                              //Actively destroke
        return;
     }
285  if( _mfh_R18_v_b11_ui_w_error > R18_MFH_RUNTIME_MAX_V_B11_UI )  //R-18 Pot voltage should always fall betwee
     {
        if( !_fault_F404_set_flag_bt )
            fault_log_add_fault( _F404_03 );

290     _fault_F404_set_flag_bt = TRUE;
        _mfh_R18_v_b11_ui_w_error = 0xfd00;                                  // reset to 'voltage above normal or shorted
        propulsion_ESTOP_state_machine_start();                              //Actively destroke
        return;
     }
295
     // Test for MFH going out of neutral or coming back into neutral if( _mfh_R18_v_b11_ui_w_error > ( ee_mfh_fwd_swpoint_coming_back_v_b11_ui + volts_v_b11_ui( 0.015 ) )    // th
300     && _mfh_R18_v_b11_ui_w_error < ( ee_mfh_rev_swpoint_coming_back_v_b11_ui - volts_v_b11_ui( 0.015 ) ) ) // th
     {
        _mfh_is_back_into_neutral_bt = TRUE;
     }
305  else
     {
```

*Fig. 21*

```
310      ) _mfh_R18_v_b11_ui_w_error > ee_mfh_rev_swpoint_going_out_v_b11_ui + volts_v_b11_ui( 0.025 ) )   // the
         ) _mfh_is_out_of_neutral_bt = TRUE;                                  + volts_v_b11_ui( 0.025 ) )   // the
      }

315   /**********************************************************************************************/
      unsigned int   mfh_R18_v_b11_ui_w_errors_returned( void )
      {
320     return( _mfh_R18_v_b11_ui_w_error );
      }

/**********************************************************************************************/
      bit   mfh_is_back_to_neutral_status_xp()
325   {
        return( _mfh_is_back_into_neutral_bt );
      }

/**********************************************************************************************/
330   bit   mfh_is_out_of_neutral_status_xp()
      {
        return( _mfh_is_out_of_neutral_bt );
335   }

/**********************************************************************************************/
      bit   mfh_calibration( const unsigned int machine_mode_b0_ui )
340   {
        switch( machine_mode_b0_ui )
        {
          case INIT_main_STATE_MACHINE:
          case CRITICAL_EE_VARS_OUT_OF_BOUNDS:
          case WAKEUP_TEST_OUTPUTS:
          case WAKEUP_LIGHTS_ONLY:
          case NORMAL_ENGINE_OFF:
          case NORMAL_ENGINE_STARTING:
          case CALIBRATION_ENGINE_STARTING:
          case CALIBRATION_ENGINE_RUNNING:
          case NORMAL_ENGINE_RUNNING:
          case POWER_DOWN:
          case XCM_SETUP:
                  // do nothing
            return(0);                              // signify a normal return 350       case WAKEUP_APPLICATION_INIT:
```

Fig. 22

```
310         if(  _mfh_R18_v_b11_ui_w_error < ee_mfh_fwd_swpoint_going_out_v_b11_ui - volts_v_b11_ui( 0.025 )     // the
             || _mfh_R18_v_b11_ui_w_error > ee_mfh_rev_swpoint_going_out_v_b11_ui + volts_v_b11_ui( 0.025 )     // the
            )
            _mfh_is_out_of_neutral_bt = TRUE;
        }

315 /****************************************************************/
    unsigned int  mfh_R18_v_b11_ui_w_errors_returned( void )
    {
320     return( _mfh_R18_v_b11_ui_w_error );
    }

/****************************************************************/
    bit   mfh_is_back_to_neutral_status_xp()
325 {
        return( _mfh_is_back_into_neutral_bt );
    }

330 /****************************************************************/
    bit   mfh_is_out_of_neutral_status_xp()
    {
        return( _mfh_is_out_of_neutral_bt );
    }
335

/****************************************************************/
    bit  mfh_calibration( const unsigned int machine_mode_b0_ui )
    {
340     switch( machine_mode_b0_ui )
        {
            case INIT_main_STATE_MACHINE:
            case CRITICAL_EE_VARS_OUT_OF_BOUNDS:
            case WAKEUP_TEST_OUTPUTS:
345         case WAKEUP_LIGHTS_ONLY:
            case NORMAL_ENGINE_OFF:
            case NORMAL_ENGINE_STARTING:
            case CALIBRATION_ENGINE_STARTING:
            case CALIBRATION_ENGINE_RUNNING:
350         case NORMAL_ENGINE_RUNNING:
            case POWER_DOWN:
            case XCM_SETUP:
                // do nothing
                return(0);                         // signify a normal return
355         case WAKEUP_APPLICATION_INIT:
```

Fig. 23

```
            _mfh_cal_state_b0_ui = _prev_mfh_cal_state_b0_ui = WAIT_4_MENU_START_ACTION;
            _timer02_ui = 0;

360         return(0);                                  // signify a normal return case DIAG_N_SETUP_ENGINE_OFF:

365         if( !economy_model_b_xp )
                mfh_R18_S03_calibration();

return(0);

370     )
    /*********************************************************************************/
375 static void mfh_R18_S03_calibration( void )
    {
    /*
     Description: Calibration Function for the MFH on a deluxe machine.
     This function is called from the Diagnostics/Calibrations menu.
    */
380     static   const void*    _mfh_handle_cal_msg;
             unsigned int   _mfh_position_v_b1l_ui;
             unsigned int   _fwd_sw_point_center_v_b1l_ui;
             unsigned int   _rev_sw_point_center_v_b1l_ui;
385          unsigned int   _25percentpoint_v_b1l_ui;

#define  _park_brake_relay_low_side_enabled    external_park_brake_release()
    #define  _propulsion_pwr_on                    ( iomap_HSDoutviaLSD_K35_fnr_neutral_relay = 1 )   // HSD_19 on
    #define  _propulsion_pwr_off                   ( iomap_HSDoutviaLSD_K35_fnr_neutral_relay = 0 )   // HSD_19 off
    #define  _mfh_S03_switch_in_neutral            iomap_digin_swstate_S03_fnr_neutral.debounced     // N/C switch.
390 #define  _mfh_S03_switch_not_in_neutral        !_mfh_S03_switch_in_neutral 395     if( _mfh_cal_state_b0_ui >= WANT_PARK_BRAKE_DISENGAGED )
        {
            _park_brake_relay_low_side_enabled;     // default - Park Brake must be diseng
400         _propulsion_pwr_on;                     // default - don't provide +12 power t
            _mfh_position_v_b1l_ui = mfh_position_R18_v_b1l_ui();

if( _mfh_position_v_b1l_ui < R18_MFH_ABSOLUTE_MIN_V_B1l_UI )
            {
405             ee_fnr_full_rev_v_b1l_ui =
                ee_mfh_rev_swpoint_going_out_v_b1l_ui =
                ee_mfh_rev_swpoint_coming_back_v_b1l_ui =
                ee_mfh_fwd_swpoint_coming_back_v_b1l_ui =
                ee_mfh_fwd_swpoint_going_out_v_b1l_ui =
```

Fig. 24

```
410         ee_fnr_full_fwd_v_b11_ui = 0xfc00;                      // hit 'em all with "UNCALIBRATED" val
            fault_log_add_fault( _F404_04 );                        // voltage below normal or shorted to
            _mfh_handle_cal_msg = _cal_failed_menu;
            _mfh_cal_state_b0_ui = MFH_CAL_FAILED;
          }
415       if( _mfh_position_v_b11_ui > R18_MFH_ABSOLUTE_MAX_V_B11_UI )
          {
420         ee_mfh_full_rev_v_b11_ui =
            ee_mfh_rev_swpoint_going_out_v_b11_ui =
            ee_mfh_rev_swpoint_coming_back_v_b11_ui =
            ee_mfh_fwd_swpoint_coming_back_v_b11_ui =
            ee_mfh_fwd_swpoint_going_out_v_b11_ui =
            ee_fnr_full_fwd_v_b11_ui = 0xfc00;                      // hit 'em all with "UNCALIBRATED" val
425         fault_log_add_fault( _F404_03 );                        // voltage above normal or shorted to
            _mfh_handle_cal_msg = _cal_failed_menu;
            _mfh_cal_state_b0_ui = MFH_CAL_FAILED;
          }
430       switch( _mfh_cal_state_b0_ui )
          {
          case WAIT_4_MENU_START_ACTION:                            // waiting here - menu selection will
435         _mfh_handle_cal_msg = _mfh_cal_state_set_switch_neutral_menu;  // init the message ptr - "Slowly Move break;
440       case MFH_CAL_EXIT:
            _propulsion_pwr_off;

if( ++_timer02_ui > _time_b0_ui28cans_sec_f( 3.0 ) )
            {
445           _timer02_ui = 0;
              _mfh_handle_cal_msg = _cal_ended_key_off;             // message "Please Key Off"
              _mfh_cal_state_b0_ui = MFH_CAL_EXIT_KEYOFF_IDLE;
            }
450       break;
          case MFH_CAL_EXIT_KEYOFF_IDLE:
              //do nothing
          break;
455       case MFH_CAL_TERMINATE:
              _timer02_ui = 0;
              _mfh_handle_cal_msg = _cal_failed_menu;               // message "Calibration Failed!"
```

Fig. 25

```
460          Alarm_OneShot_1sec();                                    // indicate failure with beep
             _mfh_cal_state_b0_ui = MFH_CAL_EXIT;                     // go to the next state break;

465    case WANT_PARK_BRAKE_DISENGAGED:
             _propulsion_pwr_off;                                     // don't provide +12 power to if( park_brake_status_off_bt_xp )                        // if park brake is disengage
470          {
                _timer02_ui = 0;
                _mfh_cal_state_b0_ui = TEST_4_MFH_IN_NEUTRAL;
             }
             else
475             _mfh_handle_cal_msg = _mfh_cal_state_warning_menu;    // "Calibrating MFH... Switch break;

case TEST_4_MFH_IN_NEUTRAL:

480          if( ++_timer02_ui > _time_b0_ui2scans_sec_f( 0.1 ) )     // allow brief delay for powe
             {
                if( _mfh_S03_switch_not_in_neutral )                  // if J1B_26_SW_08 is not hig
                {
485                _timer02_ui = 0;
                   _mfh_handle_cal_msg = _mfh_cal_state_set_switch_neutral_menu;
                   _mfh_cal_state_b0_ui = GET_THE_RELAY_UNLATCHED;    // message "Slowly Move MFH T
                }                                                    // the propulsion latch relay
                else
490             {
#ifdef IGNORE_THE_POWER_FAULTS_RIGHT_NOW                             // this is only for the simulator
                   // good - move on
                   ee_mfh_rev_swpoint_going_out_v_b11_ui = 0xfc00;    // reset as "UNCALIBRATED" ju
495                _mfh_handle_cal_msg = _mfh_cal_state_full_rev_menu;  // message "Slowly Move MFH T
                   _mfh_cal_state_b0_ui = GOING_REARWARD_2_SEE_S03_TRANSITION;  // go to the next state
#else
                   // test to see if the relay got latched on
                   if( iomap_anin_swstate_12VD_power.debounced )      // test for +12VD - we don't
500                {
                      _timer02_ui = 0;
                      _mfh_handle_cal_msg = _mfh_cal_state_set_switch_neutral_menu;  // message "Slowly Move MFH T
                      _mfh_cal_state_b0_ui = GET_THE_RELAY_UNLATCHED; // the propulsion latch relay
                   }
                   else
505                {
                      // good - move on
                      ee_mfh_rev_swpoint_going_out_v_b11_ui = 0xfc00; // reset as "UNCALIBRATED" ju
                      _mfh_handle_cal_msg = _mfh_cal_state_full_rev_menu;  // message "Slowly Move MFH T
510                   _mfh_cal_state_b0_ui = GOING_REARWARD_2_SEE_S03_TRANSITION;  // go to the next state
```

Fig. 26

```
      #endif
            )
            )

515         break;

case GET_THE_RELAY_UNLATCHED:

520         _propulsion_pwr_off;                                    // stop providing +12 propulsion power from ifdef IGNORE_THE_POWER_FAULTS_RIGHT_NOW                      // this is only for the simulator
            _timer02_ui = 0;
            _mfh_cal_state_b0_ui = WANT_PARK_BRAKE_DISENGAGED;
525   #else
            if( !iomap_anin_swstate_12VD_power.debounced )          // test for +12VD - good if it's gone
            (
              _timer02_ui = 0;
              _mfh_cal_state_b0_ui = WANT_PARK_BRAKE_DISENGAGED;    // go to the next state
530         )

if( ++_timer02_ui > _time_b0_ui2scans_sec_f( 0.3 ) )    // if it's gone this long...
            (
              fault_log_add_fault( _F408_03 );                      // S-03 neutral switch...voltage above norma
              _mfh_handle_cal_msg = _cal_failed_menu;               // somethings's bad
535           _mfh_cal_state_b0_ui = MFH_CAL_FAILED;                // go to the next state
            )
      #endif
540         break;

case GOING_REARWARD_2_SEE_S03_TRANSITION:

545         if( __mfh_S03_switch_not_in_neutral )                   // test for S03 transitioning low
            ( /*********************************************/
      #ifdef  engr_data_acq_MPH_cal_points
550   CAN_test_data [0].word =
      #endif
      /*********************************************/ ee_mfh_rev_swpoint_going_out_v_b11_ui = __mfh_position_v_b11_ui;  // potentiometer reading on the
555           Alarm_OneShot_50ms();

if( ee_mfh_rev_swpoint_going_out_v_b11_ui < S03_MFH_REV_SWPOINT_GOING_OUT_MIN_V_B11_UI )
              (
                fault_log_add_fault( _F420_04 );                    // R-18 mfh rev swpoint going out voltage be
560             _mfh_handle_cal_msg = _cal_failed_menu;             // bad -
                _mfh_cal_state_b0_ui = MFH_CAL_FAILED;              // go to the next state
```

```
          }
          else if( ee_mfh_rev_swpoint_going_out_v_b11_ui > S03_MFH_REV_SWPOINT_GOING_OUT_MAX_V_B11_UI )
          {
565           fault_log_add_fault( _F420_03 );                  // R-18 mfh rev swpoint going out voltage ab
              _mfh_handle_cal_msg = _cal_failed_menu;            // bad -
              _mfh_cal_state_b0_ui = MFH_CAL_FAILED;             // go to the next state
          }
          else
570           _mfh_cal_state_b0_ui = GOING_FULLY_REARWARD_WAIT_FOR_OK;  // go to the next state break;

575     case GOING_FULLY_REARWARD_WAIT_FOR_OK:

#ifdef  IGNORE_THE_POWER_FAULTS_RIGHT_NOW                         // this is only for the simulator
580       if( _interactive_cal_proceed_flag_b0_uc )
          {
              ee_fnr_full_fwd_v_b11_ui = 0xfc00;                  // reset as "UNCALIBRATED" just prior to tes
              _mfh_cal_state_b0_ui = HAS_PRESSED_OK_AT_FULLY_REARWARD; // go to the next state
          }
585  #else
          if( iiomap_anin_swstate_12VD_power.debounced )          // if +12VD is not there
          {
590           fault_log_add_fault( _F435_04 );                    // prop enable relay voltage below normal or
              _mfh_handle_cal_msg = _cal_failed_menu;             // bad -
              _mfh_cal_state_b0_ui = MFH_CAL_FAILED;              // go to the next state
          }
          if( _interactive_cal_proceed_flag_b0_uc )
          {
              ee_fnr_full_fwd_v_b11_ui = 0xfc00;                  // reset as "UNCALIBRATED" just prior to tes
595           _mfh_cal_state_b0_ui = HAS_PRESSED_OK_AT_FULLY_REARWARD; // go to the next state
          }
600  #endif
          break;

605     case HAS_PRESSED_OK_AT_FULLY_REARWARD:

#ifdef  IGNORE_THE_POWER_FAULTS_RIGHT_NOW                         // this is only for the simulator
          // test to see if it's out of bounds
          if( _mfh_position_v_b11_ui < R18_CALCHK_MFH_REV_MIN_V_B11_UI )
          {
610           fault_log_add_fault( _F421_04 );                    // ee_fnr_full_rev_v_b11_ui voltage
              _mfh_handle_cal_msg = _cal_failed_menu;             // bad -
```

```
         _mfh_cal_state_b0_ui = MFH_CAL_FAILED;                                         // go to the next state
      }
615   else if( __mfh_position_v_b11_ui > R18_CALCHK_MFH_REV_MAX_V_B11_UI )
      {
         fault_log_add_fault( _F421_03 );                                               // ee_fnr_full_rev_v_b11_ui voltage
         _mfh_handle_cal_msg = _cal_failed_menu;                                        /// bad -
         _mfh_cal_state_b0_ui = MFH_CAL_FAILED;                                         /// go to the next state
      }
620   else
      {
         ee_fnr_full_rev_v_b11_ui = __mfh_position_v_b11_ui;                            // store the value in EE ram
         ee_mfh_rev_swpoint_coming_back_v_b11_ui = 0xfc00;                              /// reset as "UNCALIBRATED" just pri
625      _mfh_handle_cal_msg = _mfh_cal_state_set_switch_neutral_menu;                  /// message "Slowly Move MFH To Neut
         _mfh_cal_state_b0_ui = BACK_2_NEUTRAL_2_SEE_S03_TRANSITION;                    /// go to the next state
      }

630   // test to see if it's out of bounds
      if( __mfh_S03_switch_in_neutral )
      {
         fault_log_add_fault( _F408_03 );                                               // S03 high would be bad
635      _mfh_handle_cal_msg = _cal_failed_menu;                                        /// bad -
         _mfh_cal_state_b0_ui = MFH_CAL_FAILED;                                         /// go to the next state
      }
640   else if( !iomap_anin_swstate_12VD_power.debounced )
      {
         fault_log_add_fault( _F435_04 );                                               // +12VD should be there
         _mfh_handle_cal_msg = _cal_failed_menu;                                        /// prop enable relay voltage below
         _mfh_cal_state_b0_ui = MFH_CAL_FAILED;                                         /// bad -
      }                                                                                 /// go to the next state
645   else if( __mfh_position_v_b11_ui < R18_CALCHK_MFH_REV_MIN_V_B11_UI )
      {
         fault_log_add_fault( _F421_04 );                                               // ee_fnr_full_rev_v_b11_ui voltage
         _mfh_handle_cal_msg = _cal_failed_menu;                                        /// bad -
         _mfh_cal_state_b0_ui = MFH_CAL_FAILED;                                         /// go to the next state
      }
650   else if( __mfh_position_v_b11_ui > R18_CALCHK_MFH_REV_MAX_V_B11_UI )
      {
         fault_log_add_fault( _F421_03 );                                               // ee_fnr_full_rev_v_b11_ui voltage
         _mfh_handle_cal_msg = _cal_failed_menu;                                        /// bad -
655      _mfh_cal_state_b0_ui = MFH_CAL_FAILED;                                         /// go to the next state
      }
      else
      {

660   /***********************************/
      #ifdef engr_data_acq_MFH_cal_points
      CAN_test_data [1].word =
      #endif
```

*Fig. 29*

```
          /**********************************************/
665           ee_fnr_full_rev_v_b11_ui = _mfh_position_v_b11_ui;
              ee_mfh_rev_swpoint_coming_back_v_b11_ui = 0xfc00;          // store the value in EE ram
              _mfh_rev_swpoint_coming_back_v_b11_ui = _mfh_cal_state_set_switch_neutral_menu;   // reset as "UNCALIBRATED" just pri
              _mfh_handle_cal_msg = _mfh_cal_state_set_switch_neutral_menu;                      // message "Slowly Move MFH To Neut
              _mfh_cal_state_b0_ui = BACK_2_NEUTRAL_2_SEE_S03_TRANSITION;                        // go to the next state
670       #endif
              break;
675       case BACK_2_NEUTRAL_2_SEE_S03_TRANSITION:
          #ifdef IGNORE_THE_POWER_FAULTS_RIGHT_NOW          // this is only for the simulator
680           if( _mfh_S03_switch_in_neutral )              // test for S03 transitioning back high
              {
              ee_mfh_rev_swpoint_coming_back_v_b11_ui = _mfh_position_v_b11_ui;    // potentiometer reading on t
              Alarm_OneShot_50ms();
685           if( ee_mfh_rev_swpoint_coming_back_v_b11_ui < S03_MFH_REV_SWPOINT_COMING_BACK_MIN_V_B11_UI )
              {
                  fault_log_add_fault( _F420_04 );           // ee_mfh_rev_swpoint_going_out_v_b11_ui vol
                  _mfh_handle_cal_msg = _cal_failed_menu;   // bad -
                  _mfh_cal_state_b0_ui = MFH_CAL_FAILED;    // go to the next state
690           }
              else if( ee_mfh_rev_swpoint_coming_back_v_b11_ui > S03_MFH_REV_SWPOINT_COMING_BACK_MAX_V_B11_UI )
              {
                  fault_log_add_fault( _F420_03 );           // ee_mfh_rev_swpoint_going_out_v_b11_ui vol
                  _mfh_handle_cal_msg = _cal_failed_menu;   // bad -
695               _mfh_cal_state_b0_ui = MFH_CAL_FAILED;    // go to the next state
              }
              else if( ee_mfh_rev_swpoint_going_out_v_b11_ui - ee_mfh_rev_swpoint_coming_back_v_b11_ui > S03_MAX_HY
              {
                  fault_log_add_fault( _F420_03 );           // ee_mfh_rev_swpoint_going_out_v_b11_ui vol
700               _mfh_handle_cal_msg = _cal_failed_menu;   // bad -
                  _mfh_cal_state_b0_ui = MFH_CAL_FAILED;    // go to the next state
              }
              else
              {
                  _timer02_ui = 0;
705               _mfh_cal_state_b0_ui = TEST_4_RELAY_UNLATCH;            // go to the next state
              }
              }
710       #else
              if( !iomap_anin_swstate_12VD_power.debounced )              // +12VD should be there
              {
                  fault_log_add_fault( _F435_04 );                         // prop enable relay voltage below normal or
```

```
715             __mfh_handle_cal_msg = _cal_failed_menu;        // bad -
                __mfh_cal_state_b0_ui = MFH_CAL_FAILED;          // go to the next state
            )
720         if( __mfh_S03_switch_in_neutral )                    // test for S03 transitioning back high
            (
        /****************************************/
        #ifdef engr_data_acq_MFH_cal_points
        CAN_test_data[2].word =
725     #endif
        /****************************************/
            ee_mfh_rev_swpoint_coming_back_v_b11_ui = __mfh_position_v_b11_ui;    // potentiometer reading on t
            Alarm_OneShot_50ms();
730         if( ee_mfh_rev_swpoint_coming_back_v_b11_ui < S03_MFH_REV_SWPOINT_COMING_BACK_MIN_V_B11_UI )
            (
                fault_log_add_fault( _F420_04 );                 // ee_mfh_rev_swpoint_going_out_v_b11_ui vol
                __mfh_handle_cal_msg = _cal_failed_menu;         // bad -
                __mfh_cal_state_b0_ui = MFH_CAL_FAILED;          // go to the next state
            )
735         else if( ee_mfh_rev_swpoint_coming_back_v_b11_ui > S03_MFH_REV_SWPOINT_COMING_BACK_MAX_V_B11_UI )
            (
                fault_log_add_fault( _F420_03 );                 // ee_mfh_rev_swpoint_going_out_v_b11_ui vol
                __mfh_handle_cal_msg = _cal_failed_menu;         // bad -
740             __mfh_cal_state_b0_ui = MFH_CAL_FAILED;          // go to the next state
            )
            else if( ee_mfh_rev_swpoint_going_out_v_b11_ui - ee_mfh_rev_swpoint_coming_back_v_b11_ui > S03_MAX_HY
            (
                fault_log_add_fault( _F420_07 );                 // mfh handle pot rev sw point out of mechan
745             __mfh_handle_cal_msg = _cal_failed_menu;         // bad -
                __mfh_cal_state_b0_ui = MFH_CAL_FAILED;          // go to the next state
            )
            else
            (
750             _timer02_ui = 0;
                __mfh_cal_state_b0_ui = TEST_4_RELAY_UNLATCH;    // go to the next state
            )
        )
755 #endif
            break;

760     case TEST_4_RELAY_UNLATCH:
            __propulsion_pwr_off;                                // don't provide +12 power to the propulsion
765         if( ++_timer02_ui > _time_b0_ui2scans_sec_f( 1.0 ) ) // allow brief delay for power and debouncin
            (
```

```
        #ifdef  IGNORE_THE_POWER_FAULTS_RIGHT_NOW    // this is only for the simulator
                _timer02_ui = 0;
                _mfh_cal_state_b0_ui = TEST_4_MFH_IN_NEUTRALL;   // go to the next state
        #else
770             if( lomap_anin_swstate_12VD_power.debounced )    // +12VD should not be there
                {
                    fault_log_add_fault( _F435_03 );             // prop enable relay voltage above normal or
                    _mfh_handle_cal_msg = _cal_failed_menu;      // bad -
                    _mfh_cal_state_b0_ui = MFH_CAL_FAILED;       // go to the next state
775             }
                else
                {
                    _timer02_ui = 0;
780                 _mfh_cal_state_b0_ui = TEST_4_MFH_IN_NEUTRALL; // go to the next state
                }
        #endif
                break;
785     case TEST_4_MFH_IN_NEUTRALL:

if( ++_timer02_ui > _time_b0_ui2scans_sec_f( 0.1 ) ) // allow brief delay for power and debouncin
                {
790                 if( _mfh_S03_switch_not_in_neutral )              // if J1B_26_SW_08 is not high (not in neutr
                    {
                        // if you're here the propulsion latch relay is also now latched up
                        _timer02_ui = 0;
                        _mfh_handle_cal_msg = _mfh_cal_state_set_switch_neutral_menu;  // message "Slowly Move MFH T
795                     _mfh_cal_state_b0_ui = GET_THE_RELAY_UNLATCHEDD;               // this will tigger the messa
                    }
                    else
                    {
        #ifdef  IGNORE_THE_POWER_FAULTS_RIGHT_NOW    // this is only for the simulator
800                     ee_mfh_fwd_swpoint_going_out_v_b11_ui = 0xfc00;                // reset as "UNCALIBRAT
                        _mfh_handle_cal_msg = _mfh_cal_state_full_fwd_menu;            // message "Slowly Move MFH T
                        _mfh_cal_state_b0_ui = GOING_FORWARD_AND_SEE_S03_TRANSITION;   // go to the next state
        #else
                        // test to see if the relay got latched on
805                     if( lomap_anin_swstate_12VD_power.debounced )                  // test for +12VD - we don't
                        {
                            _timer02_ui = 0;
                            _mfh_handle_cal_msg = _mfh_cal_state_set_switch_neutral_menu; // message "Slowly Move MFH T
                            _mfh_cal_state_b0_ui = GET_THE_RELAY_UNLATCHEDD;              // the propulsion latch relay
810                     }
                        else
                        {
                            ee_mfh_fwd_swpoint_going_out_v_b11_ui = 0xfc00;               // reset as "UNCALIBRAT
                            _mfh_handle_cal_msg = _mfh_cal_state_full_fwd_menu;           // message "Slowly Move MFH T
815                         _mfh_cal_state_b0_ui = GOING_FORWARD_AND_SEE_S03_TRANSITION;  // go to the next state
                        }
```

Fig. 32

```
       #endif
          )
          break;

820    case GET_THE_RELAY_UNLATCHEDD:
          _propulsion_pwr_off;                                    // stop providing +12 propulsion power from
       #ifdef
825    case IGNORE_THE_POWER_FAULTS_RIGHT_NOW
          _timer02_ui = 0;                                         // this is only for the simulator
          mfh_cal_state_b0_ui = TEST_4_MFH_IN_NEUTRALL;
830    #else
       if( !iomap_anin_swstate_12VD_power.debounced )              // test for +12VD - good if it's gone
          (
          _timer02_ui = 0;
835       mfh_cal_state_b0_ui = TEST_4_MFH_IN_NEUTRALL;            // go to the next state
          )
       if( ++_timer02_ui > _time_b0_ui2scans_sec_f( 0.3 ) )        // allow brief delay for power and debouncin
          (
          fault_log_add_fault( _F408_03 );                         // S-03 neutral switch...voltage above norma
840       mfh_handle_cal_msg = _cal_failed_menu;                   // somethings's bad
          mfh_cal_state_b0_ui = MFH_CAL_FAILED;                    // go to the next state
          )
       #endif
845       break;

case GOING_FORWARD_AND_SEE_S03_TRANSITION:
       if( __mfh_S03_switch_not_in_neutral )                       // test for S03 transitioning low
850       (
       /*****************************************/
       #ifdef
       CAN_test_data2[0].word =
855    #endif
       /*****************************************/
          ee_mfh_fwd_swpoint_going_out_v_b11_ui = __mfh_position_v_b11_ui;   // potentiometer reading on the
          Alarm_OneShot_50ms();
860    if( ee_mfh_fwd_swpoint_going_out_v_b11_ui < S03_MFH_FWD_SWPOINT_GOING_OUT_MIN_V_B11_UI )
          (
          fault_log_add_fault( _F419_04 );                                    // R-18...ee_mfh_fwd_swpoint_going_out_v_b11
          _mfh_handle_cal_msg = _cal_failed_menu;                             // bad -
          _mfh_cal_state_b0_ui = MFH_CAL_FAILED;                              // go to the next state
          )
865    else if( ee_mfh_fwd_swpoint_going_out_v_b11_ui > S03_MFH_FWD_SWPOINT_GOING_OUT_MAX_V_B11_UI )
```

Fig. 33

```
                (                                                                   // R-18 mfh fwd swpoint going out voltage ab
                    fault_log_add_fault( _F419_03 );                                 // bad -
                    _mfh_handle_cal_msg = _cal_failed_menu;
                    _mfh_cal_state_b0_ui = MFH_CAL_FAILED;
                )
870             else
                    _mfh_cal_state_b0_ui = GOING_FULLY_FORWARD_WAIT_FOR_OK;          // go to the next state
875         break;
            case GOING_FULLY_FORWARD_WAIT_FOR_OK:
#ifdef      IGNORE_THE_POWER_FAULTS_RIGHT_NOW           // this is only for the simulator
880         if( _interactive_cal_proceed_flag_b0_uc )
                (
                    ee_fnr_full_fwd_v_b11_ui = 0xfc00;                               // reset as "UNCALIBRATED" just prior to tes
                    _mfh_cal_state_b0_ui = HAS_PRESSED_OK_AT_FULLY_FORWARD;          // go to the next state
885         )
#else
                if( !iomap_anin_swstate_12VD_power.debounced )                       // test for missing +12VD - it better be the
                (
                    fault_log_add_fault( _F435_04 );                                 // prop enable relay voltage below normal or
890                 _mfh_handle_cal_msg = _cal_failed_menu;                          // bad -
                    _mfh_cal_state_b0_ui = MFH_CAL_FAILED;
                )
895             if( _interactive_cal_proceed_flag_b0_uc )
                (
                    ee_fnr_full_fwd_v_b11_ui = 0xfc00;                               // reset as "UNCALIBRATED" just prior to tes
                    _mfh_cal_state_b0_ui = HAS_PRESSED_OK_AT_FULLY_FORWARD;          // go to the next state
900 #endif  )
            break;
            case HAS_PRESSED_OK_AT_FULLY_FORWARD:
#ifdef      IGNORE_THE_POWER_FAULTS_RIGHT_NOW           // this is only for the simulator
905         if( _mfh_position_v_b11_ui < R18_CALCHK_MFH_FWD_MIN_V_B11_UI )
                (
                                                                                     // ee_fnr_full_fwd_v_b11_ui voltage below no
                    fault_log_add_fault( _F418_04 );                                 // bad -
910                 _mfh_handle_cal_msg = _cal_failed_menu;                          // go to the next state
                    _mfh_cal_state_b0_ui = MFH_CAL_FAILED;
                )
                else if( _mfh_position_v_b11_ui > R18_CALCHK_MFH_FWD_MAX_V_B11_UI )
                (
                                                                                     // ee_fnr_full_fwd_v_b11_ui voltage above no
                    fault_log_add_fault( _F418_03 );                                 // bad -
915                 _mfh_handle_cal_msg = _cal_failed_menu;                          // go to the next state
                    _mfh_cal_state_b0_ui = MFH_CAL_FAILED;
                )
```

Fig. 34

```
        else
        {
920         ee_fnr_full_fwd_v_b11_ui = _mfh_position_v_b11_ui;        // store the value in EE ram
            ee_mfh_fwd_swpoint_coming_back_v_b11_ui = 0xfc00;           // reset as "UNCALIBRATED" just
            _mfh_handle_cal_msg = _mfh_cal_state_set_switch_neutral_menu; // message "Slowly Move MFH To N
            _mfh_cal_state_b0_ui = BACK_2_NEUTRAL_2_SEE_S03_TRANSITIONN;  // go to the next state
        }
925 #else
        if( __mfh_S03_switch_in_neutral )                               // S03 high would be bad
        {
930         fault_log_add_fault( _F408_03 );                            // S-03 neutral switch voltage abov
            _mfh_handle_cal_msg = _cal_failed_menu;                     // bad -
            _mfh_cal_state_b0_ui = MFH_CAL_FAILED;                      // go to the next state
        }
        else if( !iomap_anin_swstate_12VD_power.debounced )             // +12VD should be there
        {
935         fault_log_add_fault( _F435_04 );                            // bad -
            _mfh_handle_cal_msg = _cal_failed_menu;
            _mfh_cal_state_b0_ui = MFH_CAL_FAILED;                      // go to the next state
        }
940     else if( __mfh_position_v_b11_ui < R18_CALCHK_MFH_FWD_MIN_V_B11_UI )
        {
            fault_log_add_fault( _F418_04 );                            // ee_fnr_full_fwd_v_b11_ui volt
            _mfh_handle_cal_msg = _cal_failed_menu;                     // bad -
            _mfh_cal_state_b0_ui = MFH_CAL_FAILED;                      // go to the next state
        }
945     else if( __mfh_position_v_b11_ui > R18_CALCHK_MFH_FWD_MAX_V_B11_UI )
        {
            fault_log_add_fault( _F418_03 );                            // ee_fnr_full_fwd_v_b11_ui volt
            _mfh_handle_cal_msg = _cal_failed_menu;                     // bad -
            _mfh_cal_state_b0_ui = MFH_CAL_FAILED;                      // go to the next state
        }
950     else
        {
955 /*****************************************/
    #ifdef CAN_test_data2
        engr_data_acq_MFH_cal_points
        CAN_test_data2[1].word =
    #endif
    /*****************************************/
960         ee_fnr_full_fwd_v_b11_ui = _mfh_position_v_b11_ui;          // store the value in EE ram
            ee_mfh_fwd_swpoint_coming_back_v_b11_ui = 0xfc00;           // reset as "UNCALIBRATED" just
            _mfh_handle_cal_msg = _mfh_cal_state_set_switch_neutral_menu; // message "Slowly Move MFH To N
            _mfh_cal_state_b0_ui = BACK_2_NEUTRAL_2_SEE_S03_TRANSITIONN;  // go to the next state
        }
965 #endif
        break;
```

*Fig. 35*

```
970   case BACK_2_NEUTRAL_2_SEE_S03_TRANSITIONN:
      #ifdef IGNORE_THE_POWER_FAULTS_RIGHT_NOW       // this is only for the simulator
975        if( __mfh_S03_switch_in_neutral )         // test for S03 transitioning back high
           {
              ee_mfh_fwd_swpoint_coming_back_v_b11_ui = __mfh_position_v_b11_ui;  // potentiometer reading on t
           AlarmOneShot_50ms();
              if( ee_mfh_fwd_swpoint_coming_back_v_b11_ui < S03_MFH_FWD_SWPOINT_COMING_BACK_MIN_V_B11_UI )
980           {
                  fault_log_add_fault( _F419_04 );        // ee_mfh_fwd_swpoint_going_out_v_b11_ui vol
                  __mfh_handle_cal_msg = _cal_failed_menu; // bad -
                  __mfh_cal_state_b0_ui = MFH_CAL_FAILED;  // go to the next state
              }
985           else if( ee_mfh_fwd_swpoint_coming_back_v_b11_ui > S03_MFH_FWD_SWPOINT_COMING_BACK_MAX_V_B11_UI )
              {
                  fault_log_add_fault( _F419_03 );        // ee_mfh_fwd_swpoint_going_out_v_b11_ui vol
                  __mfh_handle_cal_msg = _cal_failed_menu; // bad -
                  __mfh_cal_state_b0_ui = MFH_CAL_FAILED;  // go to the next state
              }
990           else if( ee_mfh_fwd_swpoint_coming_back_v_b11_ui - ee_mfh_fwd_swpoint_going_out_v_b11_ui > S03_MAX_HY
              {
                  fault_log_add_fault( _F419_07 );        // mfh handle pot fwd swpoint out of mechan
                  __mfh_handle_cal_msg = _cal_failed_menu; // bad -
                  __mfh_cal_state_b0_ui = MFH_CAL_FAILED;  // go to the next state
995           }
              else
              {
                  _timer02_ui = 0;
1000              __mfh_cal_state_b0_ui = TEST_4_RELAY_UNLATCHH;  // go to the next state
              }
      #else
1005       if( !iomap_anin_swstate_12VD_power.debounced )  // +12VD should be there
           {
              fault_log_add_fault( _F435_04 );         // prop enable relay voltage below normal or
              __mfh_handle_cal_msg = _cal_failed_menu; // bad -
1010          __mfh_cal_state_b0_ui = MFH_CAL_FAILED;  // go to the next state
           }
           if( __mfh_S03_switch_in_neutral )            // test for S03 transitioning back high
1015       {
      /************************************************/
      '#ifdef  engr_data_acq_MFH_cal_points
      CAN_test_data2[2].word =
      #endif
1020  /************************************************/
```

Fig. 36

```
       ee_mfh_fwd_swpoint_coming_back_v_b11_ui = _mfh_position_v_b11_ui;        // potentiometer reading on t
       Alarm_OneShot_50ms();

1025   if( ee_mfh_fwd_swpoint_coming_back_v_b11_ui < S03_MFH_FWD_SWPOINT_COMING_BACK_MIN_V_B11_UI )
       {
           fault_log_add_fault( _F419_04 );                     // ee_mfh_fwd_swpoint_going_out_v_b11_ui vol
1030       _mfh_handle_cal_msg = _cal_failed_menu;              // bad -
           _mfh_cal_state_b0_ui = MFH_CAL_FAILED;               // go to the next state
       }
       else if( ee_mfh_fwd_swpoint_coming_back_v_b11_ui > S03_MFH_FWD_SWPOINT_COMING_BACK_MAX_V_B11_UI )
       {
           fault_log_add_fault( _F419_03 );                     // ee_mfh_fwd_swpoint_going_out_v_b11_ui vol
1035       _mfh_handle_cal_msg = _cal_failed_menu;              // bad -
           _mfh_cal_state_b0_ui = MFH_CAL_FAILED;               // go to the next state
       }
       else if( ee_mfh_fwd_swpoint_coming_back_v_b11_ui - ee_mfh_fwd_swpoint_going_out_v_b11_ui > S03_MAX_HY
       {
           fault_log_add_fault( _F419_07 );                     // mfh handle pot rev sw point out of mechan
1040       _mfh_handle_cal_msg = _cal_failed_menu;              // bad -
           _mfh_cal_state_b0_ui = MFH_CAL_FAILED;               // go to the next state
       }
       else
       {
1045       _timer02_ui = 0;
           _mfh_cal_state_b0_ui = TEST_4_RELAY_UNLATCHH;        // go to the next state
       }
       break;

case TEST_4_RELAY_UNLATCHH:
1050 #endif
1055       _propulsion_pwr_off;                                 // don't provide +12 power to the propulsion if( ++_timer02_ui > _time_b0_ui2scans_sec_f( 0.1 ) )     // allow brief delay for power and debouncin
       {
1060 #ifdef IGNORE_THE_POWER_FAULTS_RIGHT_NOW                    // this is only for the simulator
           _timer02_ui = 0;
           _mfh_handle_cal_msg = _mfh_cal_state_full_neutral_menu;  // "Pull MFH Fully Back To Neutral And
           _mfh_cal_state_b0_ui = FULLY_NEUTRAL_WAIT_FOR_OK;        //  go to the next state
1065 #else
           if( iomap_anin_swstate_12VD_power.debounced )        // +12VD should not be there
           {
               fault_log_add_fault( _F435_03 );                 // prop enable relay voltage above normal or
               _mfh_handle_cal_msg = _cal_failed_menu;          // bad -
1070           _mfh_cal_state_b0_ui = MFH_CAL_FAILED;           // go to the next state
           }
```

*Fig. 37*

```
         else
         {
1075        _timer02_ui = 0;
            __mfh_handle_cal_msg = _mfh_cal_state_full_neutral_menu;   // "Pull MFH Fully Back To Neutral And
            _mfh_cal_state_b0_ui = FULLY_NEUTRAL_WAIT_FOR_OK;          // go to the next state
         }
         #endif
1080     break;

case FULLY_NEUTRAL_WAIT_FOR_OK:
1085        if( _interactive_cal_proceed_flag_b0_uc )
            {
         #ifdef engr_data_acq_MFH_cal_points
1090        CAN_test_data[3].word = ee_full_neutral_v_b11_ui = _mfh_position_v_b11_ui;
         #else
            ee_full_neutral_v_b11_ui = _mfh_position_v_b11_ui;         // potentiometer reading at fully neutral
         #endif
1095        _timer02_ui = 0;
            __mfh_handle_cal_msg = _mfh_cal_state_wait_menu;           // "Calibrating MFH Please Wait...."
            _mfh_cal_state_b0_ui = FINAL_VERIFICATION;                 // go to the next state
            }
1100     break;

case FINAL_VERIFICATION:
            _propulsion_pwr_off;                                       // no propulsion power wanted
1105     break;

#ifdef engr_data_acq_MFH_cal_points
            // test the relationship of the rev switchpoint to the fwd switchpoint  258mv +- 40mv
1110        CAN_test_data[1].word =
            _rev_sw_point_center_v_b11_ui = ( ee_mfh_rev_swpoint_going_out_v_b11_ui + ee_mfh_rev_swpoint_coming_bac
            CAN_test_data2[1].word =
            _fwd_sw_point_center_v_b11_ui = ( ee_mfh_fwd_swpoint_going_out_v_b11_ui + ee_mfh_fwd_swpoint_coming_bac
1115        CAN_test_data2[3].word =
            _25percentpoint_v_b11_ui = ( _rev_sw_point_center_v_b11_ui - _fwd_sw_point_center_v_b11_ui ) >> 2;

if(  _rev_sw_point_center_v_b11_ui - _fwd_sw_point_center_v_b11_ui > S03_CALCHK_VOLTS_BETWEEN_SWPOINT
              || _rev_sw_point_center_v_b11_ui - _25percentpoint_v_b11_ui < ee_full_neutral_v_b11_ui )
1120        {
               ee_mfh_rev_swpoint_going_out_v_b11_ui =
```

*Fig. 38*

```
1125              ee_mfh_rev_swpoint_coming_back_v_bl1_ui =
                  ee_mfh_fwd_swpoint_coming_back_v_bl1_ui =
                  ee_mfh_fwd_swpoint_going_out_v_bl1_ui = 0xfc00;       // hit 'em with "UNCALIBRATED" valu 1130              fault_log_add_fault( _F408_03 );                       // S-03 neutral switch voltage abov
                  _mfh_handle_cal_msg = _cal_failed_menu;                // bad -
                  _mfh_cal_state_b0_ui = MFH_CAL_FAILED;                 // go to the next state
              }
              else if(    __rev_sw_point_center_v_bl1_ui < __fwd_sw_point_center_v_bl1_ui < S03_CALCHK_VOLTS_BETWEEN_S
                       || __rev_sw_point_center_v_bl1_ui > ee_full_neutral_v_bl1_ui )
              {

1135 #else
              // test the relationship of the rev switchpoint to the fwd switchpoint  258mv +- 40mv
              __rev_sw_point_center_v_bl1_ui = ( ee_mfh_rev_swpoint_going_out_v_bl1_ui + ee_mfh_rev_swpoint_coming_bac
              __fwd_sw_point_center_v_bl1_ui = ( ee_mfh_fwd_swpoint_going_out_v_bl1_ui + ee_mfh_fwd_swpoint_coming_bac
              __25percentpoint_v_bl1_ui = ( __rev_sw_point_center_v_bl1_ui - __fwd_sw_point_center_v_bl1_ui ) >> 2;

1140          if(    __rev_sw_point_center_v_bl1_ui - __fwd_sw_point_center_v_bl1_ui > S03_CALCHK_VOLTS_BETWEEN_SWPOINT
                  || __rev_sw_point_center_v_bl1_ui - __fwd_sw_point_center_v_bl1_ui < ee_full_neutral_v_bl1_ui
              {
1145              ee_mfh_rev_swpoint_going_out_v_bl1_ui =
                  ee_mfh_rev_swpoint_coming_back_v_bl1_ui =
                  ee_mfh_fwd_swpoint_coming_back_v_bl1_ui =
                  ee_mfh_fwd_swpoint_going_out_v_bl1_ui = 0xfc00;       // hit 'em with "UNCALIBRATED" valu 1150              fault_log_add_fault( _F408_07 );                       // mfh handle neutral switch out of
                  _mfh_handle_cal_msg = _cal_failed_menu;                // bad -
                  _mfh_cal_state_b0_ui = MFH_CAL_FAILED;                 // go to the next state
              }
1155          else if(    __rev_sw_point_center_v_bl1_ui - __fwd_sw_point_center_v_bl1_ui < S03_CALCHK_VOLTS_BETWEEN_S
                       || __fwd_sw_point_center_v_bl1_ui + __25percentpoint_v_bl1_ui > ee_full_neutral_v_bl1_ui
              {
#endif
1160              ee_mfh_rev_swpoint_going_out_v_bl1_ui =
                  ee_mfh_rev_swpoint_coming_back_v_bl1_ui =
                  ee_mfh_fwd_swpoint_coming_back_v_bl1_ui =
                  ee_mfh_fwd_swpoint_going_out_v_bl1_ui = 0xfc00;       // hit 'em with "UNCALIBRATED" valu 1165              fault_log_add_fault( _F408_07 );                       // mfh handle neutral switch out of
                  _mfh_handle_cal_msg = _cal_failed_menu;                // bad -
                  _mfh_cal_state_b0_ui = MFH_CAL_FAILED;                 // go to the next state
              }
              else
              {
1170              if( ++_timer02_ui > _time_b0_ui2scans_sec_f( 3.0 ) )   // delay, don't rush past the curre
                  {
```

Fig. 39

```
1175            _timer02_ui = 0;
                Alarm_OneShot_1sec();
                _mfh_handle_cal_msg = _cal_success_menu;   // indicate end with a beep
                _mfh_cal_state_b0_ui = MFH_CAL_EXIT;        // message "Calibration Successful"
            )                                                // go to the next state 1180        break;

case MFH_CAL_FAILED:
1185            _propulsion_pwr_off;
                Alarm_OneShot_1sec();                       // indicate failure with beep _timer02_ui = 0;
1190            _mfh_cal_state_b0_ui = MFH_CAL_EXIT;        // update so you go to the next state break;

1195        if( _mfh_cal_state_b0_ui != _prev_mfh_cal_state_b0_ui )   // if state changes,
                menu_change_focus( __mfh_handle_cal_msg, _type_menu_e );  // pass message pointer to display handler _prev_mfh_cal_state_b0_ui = _mfh_cal_state_b0_ui;    // refresh every scan
                _interactive_cal_proceed_flag_b0_uc = 0;             // reset flag to zero every scan
1200    }

/*********************************************************/
1205    void mfh_calibration_start(void)
        {
            _mfh_cal_state_b0_ui = WANT_PARK_BRAKE_DISENGAGED;
        }
1210    /*********************************************************/
        void mfh_calibration_proceed(void)
        {
            _interactive_cal_proceed_flag_b0_uc = 1;
        }
1215    /*********************************************************/
        void mfh_calibration_exit( void )
        {
            _mfh_cal_state_b0_ui = MFH_CAL_TERMINATE;
        }
1220    /*********************************************************/
        void load_mfh_calpoint_defaults( void )
```

1225  (
      ee_fnr_full_fwd_v_b11_ui = R18_CALCHK_MFH_FWD_NOM_V_B11_UI;
      ee_mfh_fwd_swpoint_going_out_v_b11_ui = S03_MFH_FWD_SWPOINT_GOING_OUT_NOM_V_B11_UI;
      ee_mfh_fwd_swpoint_coming_back_v_b11_ui = S03_MFH_FWD_SWPOINT_COMING_BACK_NOM_V_B11_UI;
      ee_mfh_rev_swpoint_coming_back_v_b11_ui = S03_MFH_REV_SWPOINT_COMING_BACK_NOM_V_B11_UI;
      ee_mfh_rev_swpoint_going_out_v_b11_ui = S03_MFH_REV_SWPOINT_GOING_OUT_NOM_V_B11_UI;
      ee_fnr_full_rev_v_b11_ui = R18_CALCHK_MFH_REV_NOM_V_B11_UI;
1230  )
1235
```

APPARATUS AND METHOD PROVIDING A PROPULSION SAFEING SUB-SYSTEM IN AN AGRICULTURAL WINDROWER

This application claims the benefit of U.S. Provisional Application No. 60/699,943, filed Jul. 16, 2005.

TECHNICAL FIELD

The present invention relates to vehicular safeing and, more particularly, to apparatus and a method providing a safeing sub-system for an agricultural windrower.

BACKGROUND OF THE INVENTION

U.S. Provisional Application No. 60/699,943, filed Jul. 16, 2005, is incorporated herein in its entirety by reference. U.S. Pat. No. 6,901,729 is also incorporated herein in its entirety by reference.

Vehicles, such as, but not limited to, agricultural windrowers, can utilize control algorithms for translating input signals, for instance, from operator controlled input devices such as a forward-neutral-reverse (FNR) lever, also sometimes referred to as a multi-function-handle (MFH), to systems to be controlled thereby, such as the propulsion driveline.

It is therefore desirable to have a capability to monitor the performance of such control algorithms, to ensure that the input commands are being accurately and safely translated into machine operations and movements. It is also desirable to have the capability to determine or sense when a controlled system, such as a propulsion driveline, is no longer tracking a reference input signal sufficiently well. A degradation in the tracking capability can occur for any of several reasons, such as an interrupted or corrupted communication path, such as due to electrical noise and/or damage to a conductive path such as a wiring harness, physical wear or damage, and the like. It is also desirable to have the ability to determine or sense when the controlled system is overshooting or undershooting a system bounds. For instance, a propulsion system may drive a vehicle such as a windrower at a speed greater than a set speed. A system can overshoot (measured system output exceeds the desired output value) or undershoot (measured system output is less than the desired output value), which may indicate that a controller for the output has become unstable.

SUMMARY OF THE DISCLOSURE

Accordingly, what is disclosed is apparatus and a method for monitoring the performance of control algorithms, providing a safeing subsystem for a vehicle, particularly an agricultural windrower.

A purpose of the invention is to sense when a controlled system is no longer tracking a reference input signal sufficiently well. Causes for this can be instability of the control system or a degradation in performance, as illustrated above. The invention can then take an appropriate action, such as outputting a fault signal and/or shutting down the controlled system.

According to a preferred aspect of the invention, an exponentially decaying integrator is used to monitor the tracking error. The tracking error is integrated and then multiplied by a time-dependent exponentially decaying function. This gives the algorithm a forgetting type property. That is, the most recent error signals are weighted more heavily than ones further in the past. A threshold can be set on this exponentially decaying integrator to indicate when the controlled system is no longer tracking sufficiently well. When the value of the exponentially decaying integrator exceeds the threshold, appropriate action can be taken to preserve the integrity and safety of the system, such as a fault indicator, an automatic system shutdown, or the like.

According to another preferred aspect of the invention, another algorithm for monitoring the controller stability, checks bounds. When the system is overshooting (measured system output exceeds the desired output value) or undershooting (measured system output is less than the desired output value) it is checked to make sure that the measured output value isn't at a corresponding saturation limit of the hardware, which would be an indication that the controller has become unstable.

The algorithms of the invention have applicability for the current control and position control loops of a propulsion system of an agricultural windrower. More particularly, in the design and operation of a windrower, and in all other similar equipment, it is important to consider the safety of the operator. Accordingly, the instant invention monitors the position of the propulsion cylinder (a cylinder and spring assembly) of the propulsion driveline relative to the FNR lever position. If there is a fault, the spring is allowed to take the drive shaft or propulsion rod of the propulsion driveline, to which pintel arms movable for stroking and destroking hydraulic pumps of the driveline are connected, to neutral, and the park brake is allowed to be applied.

Also, two potentiometers are affixed or mounted in connection with the Propulsion Cylinder and positioned so that at all times the combined voltage output will equal a predetermined value, here, which is 5 V. If not, it is determined that one of the potentiometers is malfunctioning and requires replacement (dual Hall tracking). The sub-system of the invention uses electrical current error integration, position error integration, and dv/dt thresholding of the FNR and Propulsion Cylinders to identify/evaluate any faults. Additionally, the system can determine if the propulsion cylinder is stuck at either of its extents.

The following formulae are preferably used for integration of current and positional errors:

propulsion cylinder integrator=$\int e^{a(T-t)}*$(position error) $dT$, with limits of integration 0 to $t$.

electrical current integrator=$\int e^{a(T-t)}*$(current error)$dT$, with limits of integration 0 to $t$.

The integrals are approximated (using integer math) via the following formula in discrete time: integral (k)=error(k)+ [A*integral(k−1)] where, k is the sample time, and 0<A<1=decay rate.

According to another aspect of the invention, the control module can be programmed such that the FNR dv/dt monitoring and fault detection only reacts to faults that would cause rapid acceleration, therefore ignoring rapid deceleration commands. The logic of this is that it is not desirable to prevent the machine from decelerating. However, the control module is programmed such that Propulsion Cylinder dv/dt monitoring reacts to acceleration and deceleration.

As another aspect of the invention, the control module can be programmed such that if the FNR lever is in forward range, and being moved towards neutral, and if the Propulsion Cylinder is lagging behind the commanded position by more than a predetermined threshold, and the driveline is in high range, then a fault condition is determined, e.g., if the machine is sluggish to respond to an operator deceleration command, then the park brake is automatically applied.

BRIEF DESCRIPTION OF THE DRAWINGS

The advantages of this invention will be apparent upon consideration of the following detailed disclosure of the invention, especially when taken in conjunction with the accompanying drawings wherein:

FIG. 8 is a listing of code of a computer program incorporating steps of a preferred embodiment of the method of the invention;

FIG. 9 is a continuation of the listing;
FIG. 10 is a continuation of the listing;
FIG. 11 is a continuation of the listing;
FIG. 13 is a continuation of the listing;
FIG. 14 is a continuation of the listing;
FIG. 15 is a continuation of the listing;
FIG. 16 is a continuation of the listing;
FIG. 17 is a continuation of the listing;
FIG. 18 is a continuation of the listing;
FIG. 19 is a continuation of the listing;
FIG. 20 is a continuation of the listing;
FIG. 21 is a continuation of the listing;
FIG. 22 is a continuation of the listing;
FIG. 23 is a continuation of the listing;
FIG. 24 is a continuation of the listing;
FIG. 25 is a continuation of the listing;
FIG. 26 is a continuation of the listing;
FIG. 27 is a continuation of the listing;
FIG. 28 is a continuation of the listing;
FIG. 29 is a continuation of the listing;
FIG. 30 is a continuation of the listing;
FIG. 31 is a continuation of the listing;
FIG. 32 is a continuation of the listing;
FIG. 33 is a continuation of the listing;
FIG. 34 is a continuation of the listing;
FIG. 35 is a continuation of the listing;
FIG. 36 is a continuation of the listing;
FIG. 37 is a continuation of the listing;
FIG. 38 is a continuation of the listing;
FIG. 39 is a continuation of the listing;
FIG. 40 is a continuation of the listing; and
FIG. 41 is a continuation of the listing.

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail. Still further, in this description, the terms FNR lever, multi-function handle and MFH referred to the same item, and therefore are interchangeable.

Figure 1:
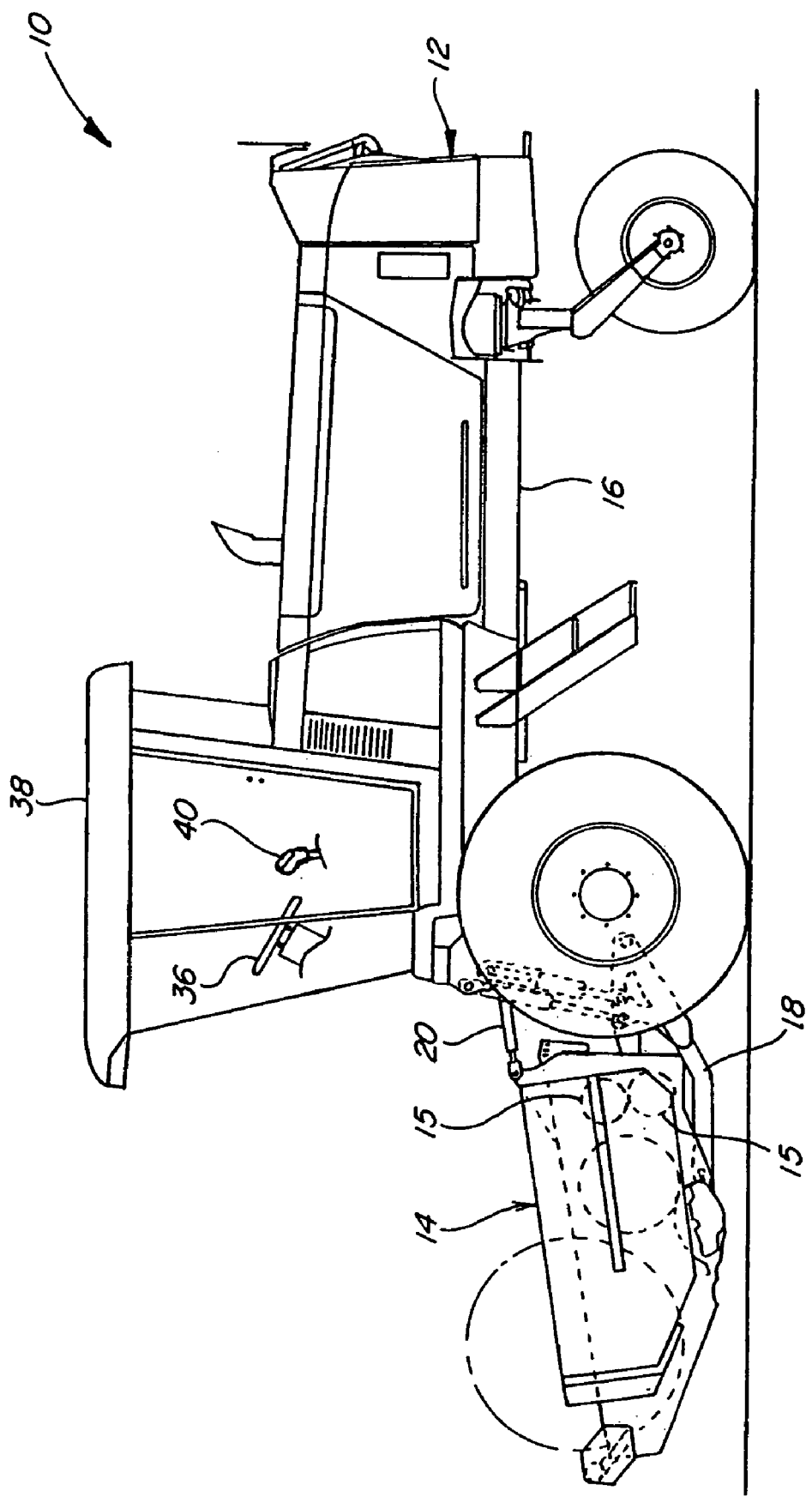
FIG. 1 is a partial side elevational view of a windrower of the type with which the invention may be used, including a header for severing crops from a field, mounted on a front end of the windrower.
Figure 2:
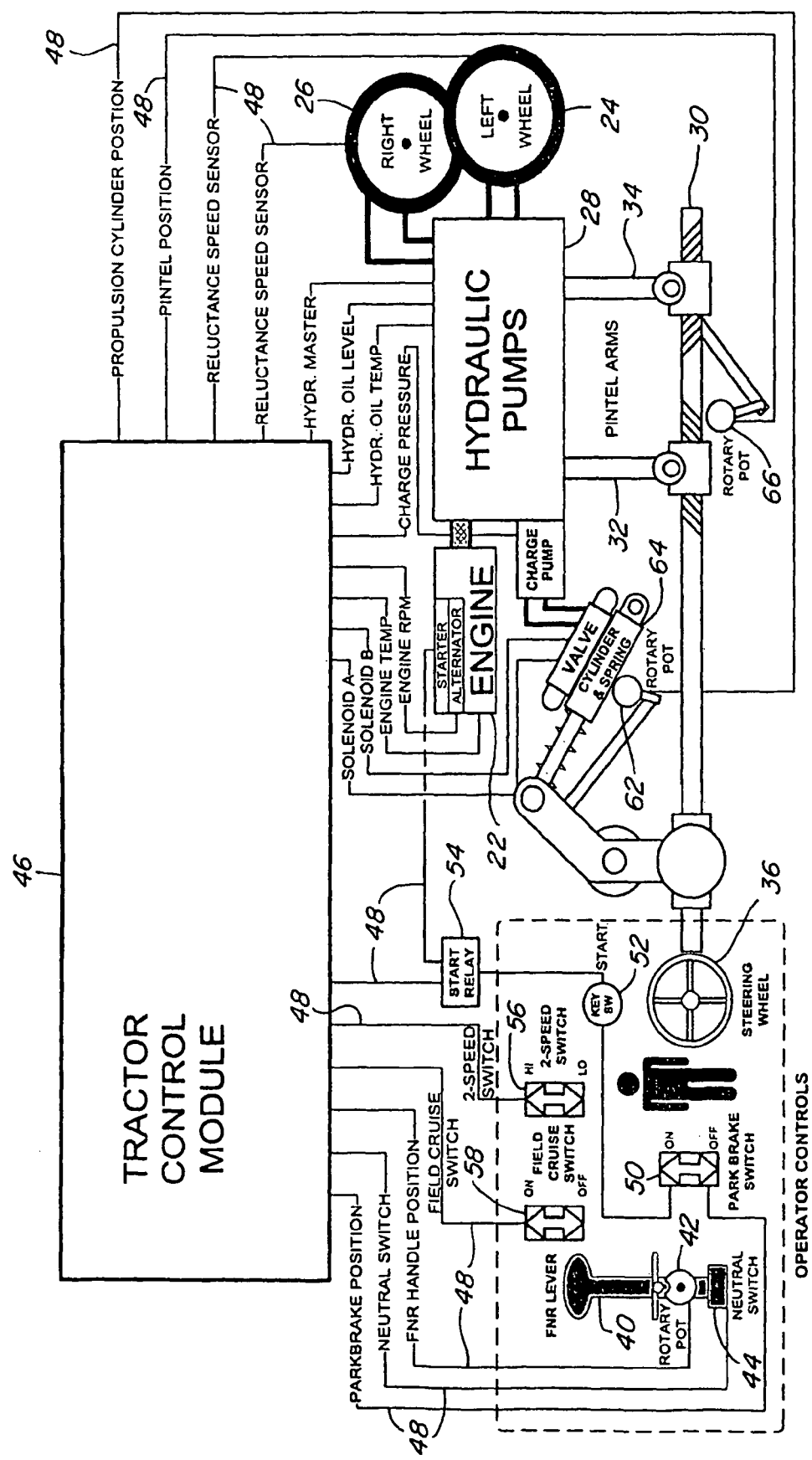
FIG. 2 is a simplified diagrammatic representation of a propulsion driveline of the windrower incorporating aspects of the instant invention.

FIG. 1 shows a self-propelled windrower 10 incorporating the apparatus and method of the invention; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20.

One or more cylinders, such as individual lift and flotation cylinders, or a single lift/flotation cylinder, interconnects the lower arm 18 and the frame 16 on each side of the header.

Typical features and operation of a system for controlling the lift and flotation functions for a header, such as header 14 depicted herein, are disclosed in U.S. Pat. No. 6,901,729, incorporated herein by reference.

Referring also to FIGS. 2, 3, 4, 5 and 6, windrower 10 includes a propulsion driveline 22 controllably operable using operator controls for rotatably driving a left wheel 24 and a right wheel 26 for propelling windrower 10 over a ground or other surface. Hydraulic motors (not shown) in connection with each wheel 24 and 26, respectively, are provided with fluid under pressure by hydraulic pumps 28, for driving the wheels. The pumps 28 can be differentially controlled for supplying different and varying amounts of pressurized fluid to the hydraulic motors, for effecting desired movements of windrower 10, including steering movements, as effected by operation of a rotatable and longitudinally movable propulsion rod 30 in connection with pintel arms 32 and 34 movable for controlling displacement of pumps 28 in the well-known manner. Steering commands are inputted to driveline 22 by an operator via an operator control which is a steering wheel 36 disposed in an operator cab 38 of windrower 10. Steering movements of windrower 10 are effected by rotating respective wheels 24 and 26 at different speeds. Propulsion speed and direction commands are inputted to driveline 22 by an operator via an operator control which is a FNR lever 40 also disposed in cab 38.

FNR lever 40 is configured to operate a suitable sensor or sensors operable for generating varying information or outputs representative of the position of lever 40 when lever 40 is manipulated or moved, including one rotary potentiometer 42 and a neutral switch 44, each of which is connected to a tractor control module 46 via a suitable conductive path or paths 48, which can be, for instance, a wire or wires of a wiring harness, an optical path, a wireless path, or the like. Tractor control module 46 can comprise a single module or processor, or multiple modules connected by a controller area network (CAN). Movements of FNR lever 40 in relation to the neutral position will cause potentiometer 42 to output a varying signal representative of the position of lever 40, which signal comprise voltage. It is desired for this voltage signal to very precisely indicate the position of lever 40, such that precise control of the forward and rearward movements of windrower 10 can be achieved.

Neutral switch 44 is also mounted and configured such that movements of FNR lever 40 into the neutral position, and out of the neutral position, will cause changes in the operating state of switch 44. Here, forward and rearward movements of FNR lever 40 from a generally straight up neutral position shown, will effect a change of state of switch 44 which will be outputted to control module 46, which will responsively power up the propulsion driveline, control module 46 controlling the propulsion speed of windrower 10 as a function of the voltage output of the potentiometer 42. Similarly, rearward movement of FNR lever 40 from the neutral position will effect a change of state of switch 44 outputted to control module 46 to affect operation of the propulsion driveline in the reverse direction, and the voltage output of the potentiometer 42 will be used to control reverse speed. It is also desired that, when lever 40 is moved into the neutral position, the propulsion system be controlled to positively de-stroke or otherwise transition into a non-propelling state over time, such that abrupt stoppage does not occur.

Other operator controls include a park brake switch 50 also connected to tractor control module 46 via a conductive path 48, and via another conductive path 48 to a key switch 52 and a start relay 54 in connection with a starter of engine 22 and with tractor control module 46. A 2-speed switch 56 is connected to tractor control module 46 via another conductive path 48, as is a field cruise switch 58.

Tractor control module 46 is in connection with a dual rotary potentiometer 62 via a conductive paths 48, potentiometer 62 being operable for outputting information representative of the position of a propulsion cylinder 64. Propulsion cylinder 64 is extendable and retractable by solenoids controlled by tractor control module 46, based on the voltage outputs of potentiometer 42, to move propulsion rod 30 longitudinally for changing the stroke of the hydraulic pumps 28 via the angle of the pintel arms 32 and 34, for effecting propulsion of the windrower. A rotary potentiometer 66 is operable for outputting information representative of the position of pintel arm 32 to module 46 via another conductive path 48, providing information representative of differential stroking of pumps 28 to effect steering movements. Information representative of speed of respective wheels 24 and 26 is determined by reluctance speed sensors (FIG. 2) and communicated via conductive paths 48 to module 46. Differences in the speed readings is also indicative of steering movements.

Figure 3:
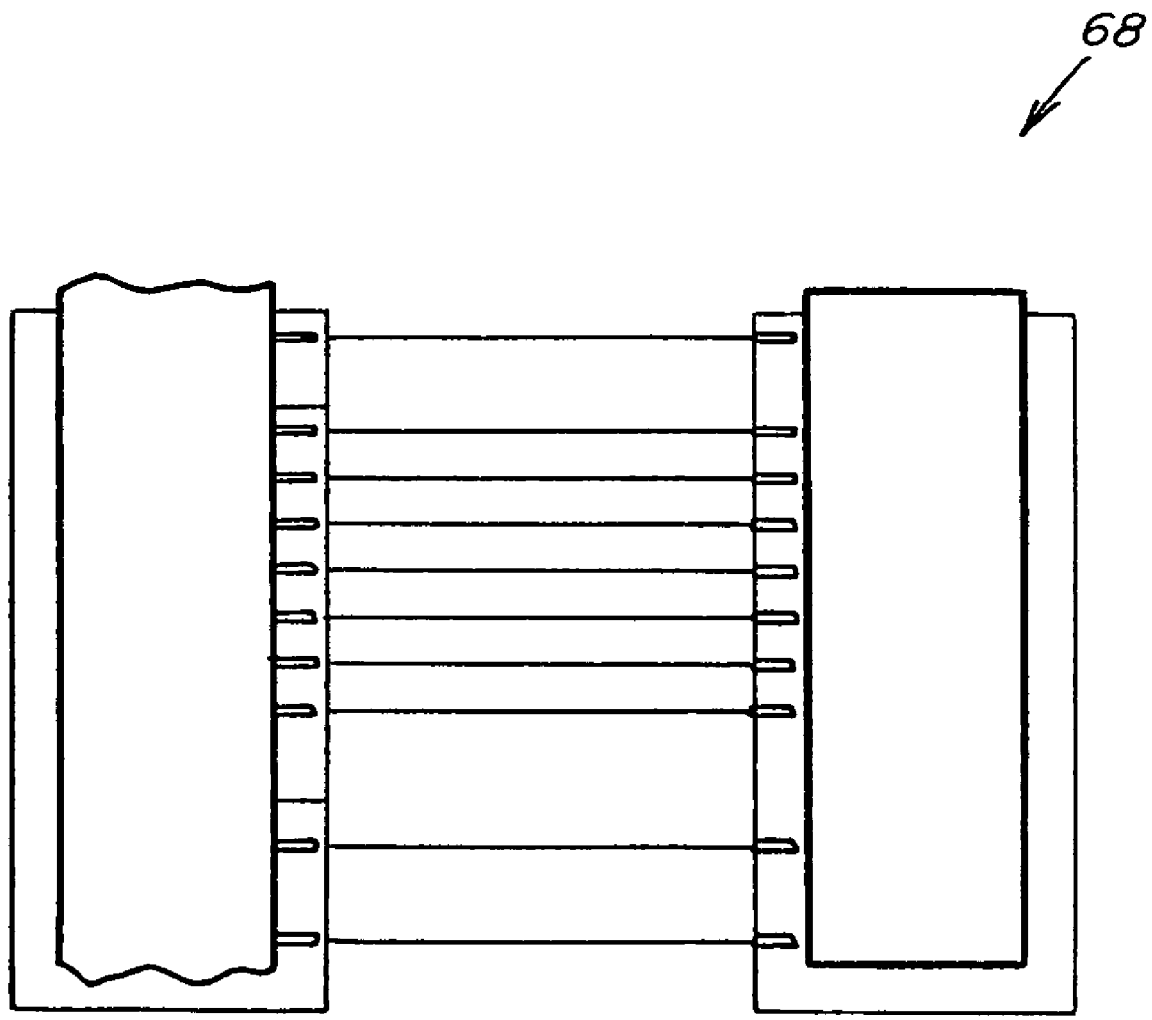
FIG. 3 is a schematic of circuitry of a multifunction handle of the windrower.

FIG. 3 schematically illustrates circuitry 68 of FNR lever 40.

Figure 4:
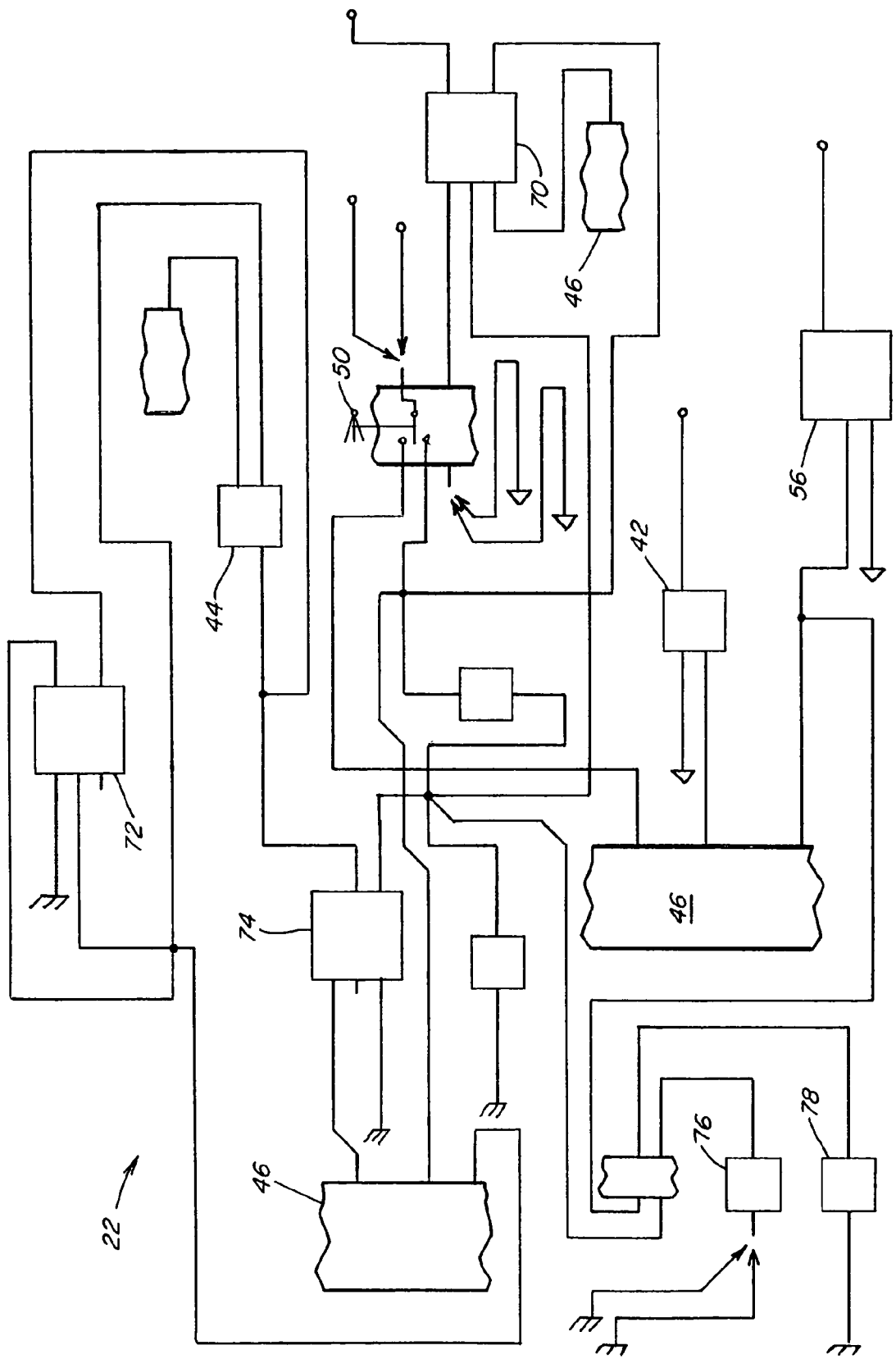
FIG. 4 is a schematic of other aspects of circuitry of the propulsion driveline.

FIG. 4 schematically illustrates aspects of propulsion driveline 22 associated primarily with the operator controls, including potentiometer 42; neutral switch 44; control module 46; park brake switch 50; speed switch 56; and additionally, a park brake latch relay 70; a propulsion enable relay 72, also sometimes referred to as a propulsion latching relay; and a propulsion interlock relay 74. Other illustrated elements of propulsion driveline 22 include a brake valve solenoid 76 and a ground speed high solenoid 78.

Figure 5:
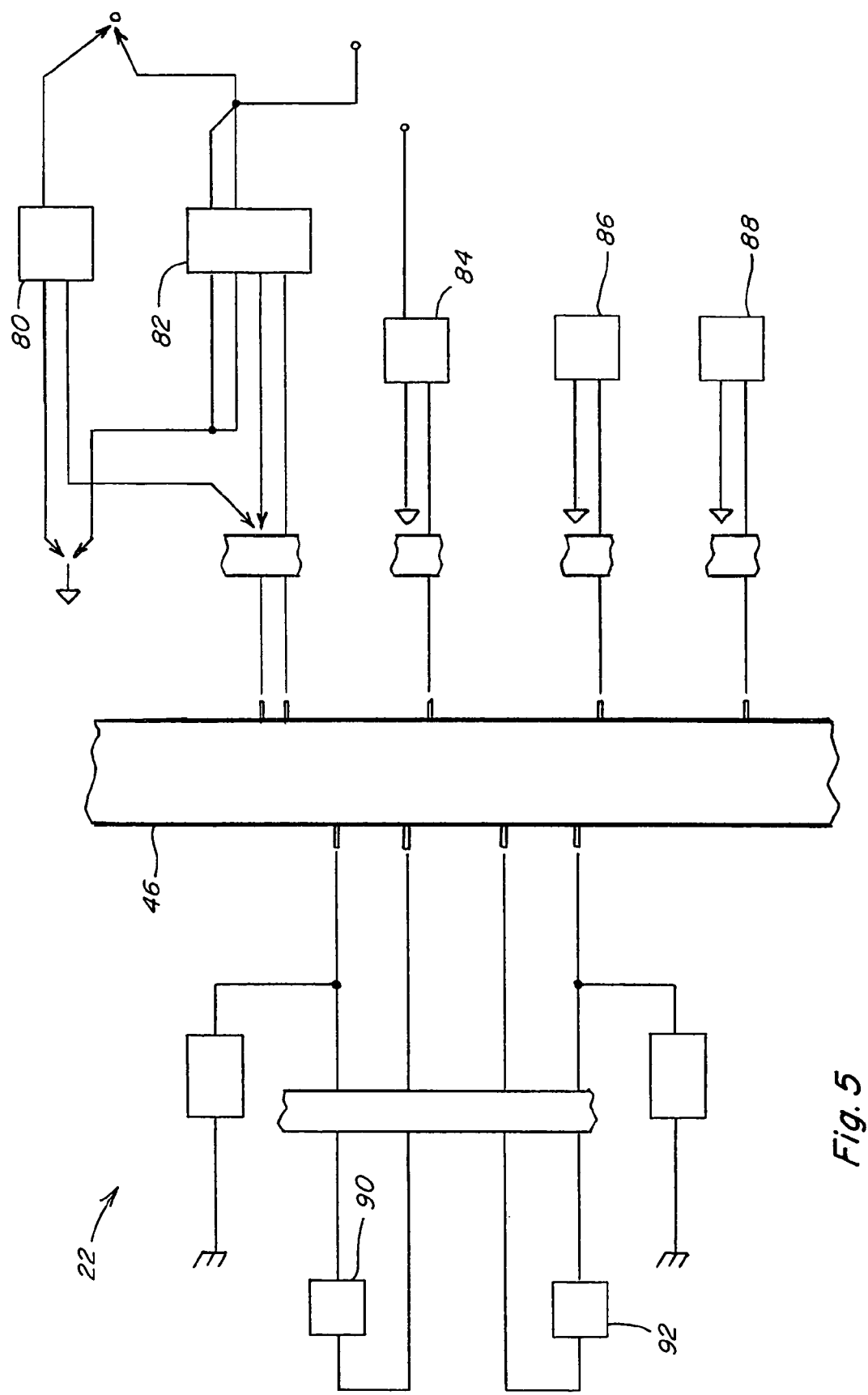
FIG. 5 is another schematic of circuitry of the propulsion driveline.

FIG. 5 schematically illustrates other aspects of propulsion driveline 22, including aspects of tractor control module 46 in connection with propulsion cylinder position sensors 80 and 82 which incorporate rotary potentiometers 62 (FIG. 2); a pintel arm position sensor 84 incorporating rotary potentiometer 66 (also FIG. 2); left and right ground speed sensors 86 and 88; a propulsion forward solenoid 90; and a propulsion reverse solenoid 92.

Figure 6:
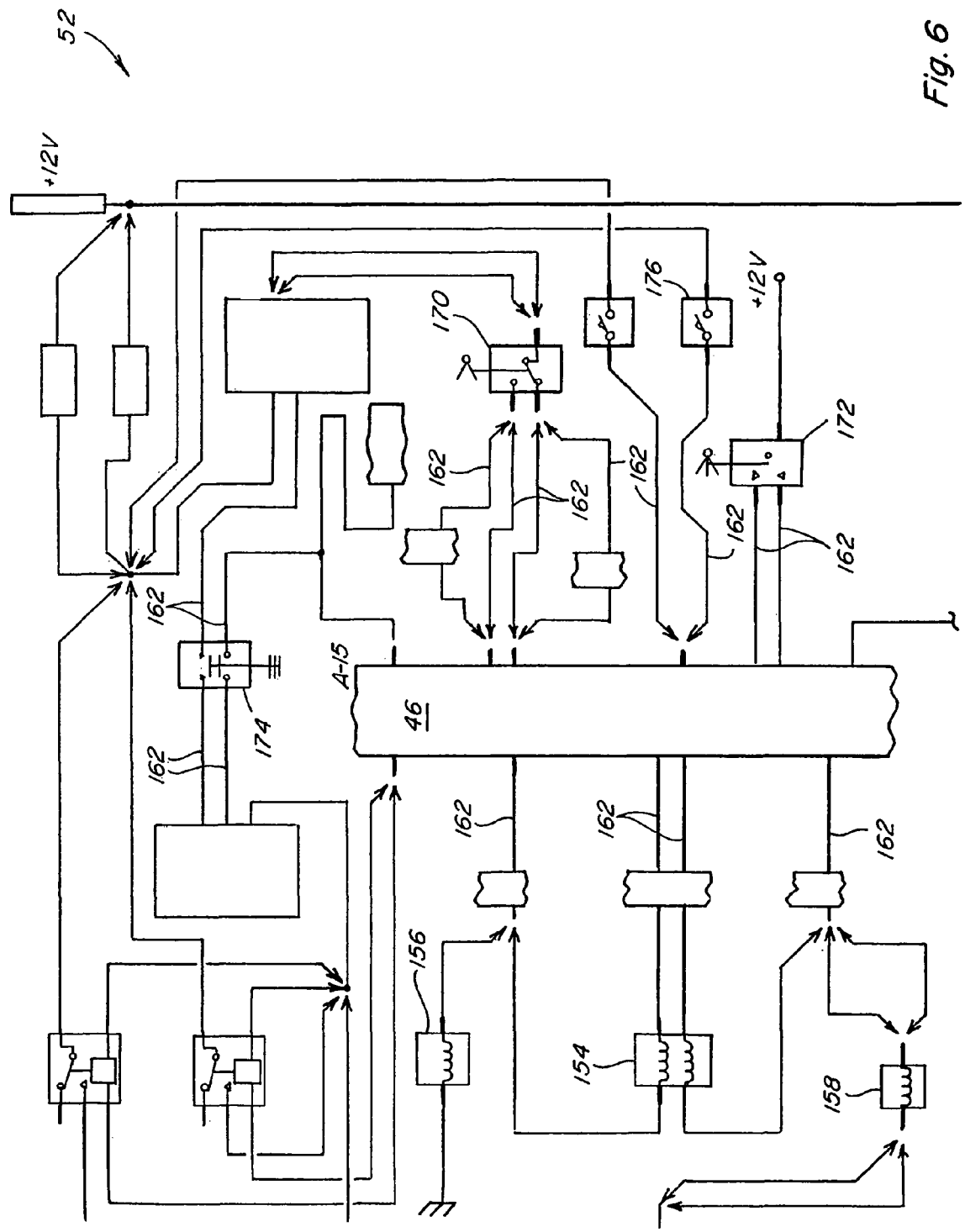
FIG. 6 is a schematic of aspects of circuitry of the propulsion driveline for the PTO of the windrower.

FIG. 6 schematically illustrates circuitry of propulsion driveline 22 for powering a PTO of windrower 10. Briefly, this portion of the driveline in one embodiment includes a header PTO forward/reverse solenoid 154 (where a header PTO forward solenoid 156 and a header PTO reverse solenoid 158 are not used). In another embodiment (where a header PTO forward/reverse solenoid 154 is not used), a header PTO forward solenoid 156, and a header PTO reverse solenoid 158 are provided. Each of solenoids 154, 156 and 158 is controlled by an electrical signal. In the embodiment where the header PTO forward/reverse solenoid 154 is used, the electrical current value of which can be very precisely controllably varied through a range between zero and a greater amount, such as 65 milliamps (ma) or greater. The driveline is operated by programmable control module 46 connected to header PTO forward/reverse solenoid 154, or header PTO forward solenoid 156 and reverse solenoid 158, by suitable conductive paths 162, which can be, for instance, wires of a wiring harness, depending on which embodiment of the driveline is being utilized. Other pertinent elements of the PTO aspects of driveline 22 include a header PTO switch 170 selectably operable by an operator for selecting a forward or reverse direction of operation of the PTO; in the embodiment where the header PTO forward/reverse solenoid 154 is used, a header speed switch 172 selectably operable by an operator for increasing or decreasing the speed of operation of the header; a header PTO emergency stop switch 174; and a seat switch 176.

As noted above, the instant invention utilizes control module 46 to monitor the propulsion command inputted thereto by potentiometer 42 indicative of the position of FNR lever 40. Essentially, the output of only one of the potentiometers 62 is required for signaling the position of the propulsion cylinder 64, but two are used (dual Hall tracking) and the voltage outputs are continually summed. If the sum does not equal a predetermined value, here 5 V, it is determined that an error in the voltage signal of one or both of the potentiometers is determined. The output of potentiometer 62 is indicative of the position of propulsion cylinder 64 of the propulsion driveline 22. The position of propulsion cylinder 64 (and thus the output of potentiometer 62) should, if normally operating, correspond to or track the inputted command from potentiometer 42, modified by a transfer function, with consideration of normal deviations such as due to hysteresis, time lag in executing the propulsion commands, and the like. dv/dt (changing voltage over time) thresholding of the FNR potentiometer is used to identify/evaluate any faults.

Figure 7:
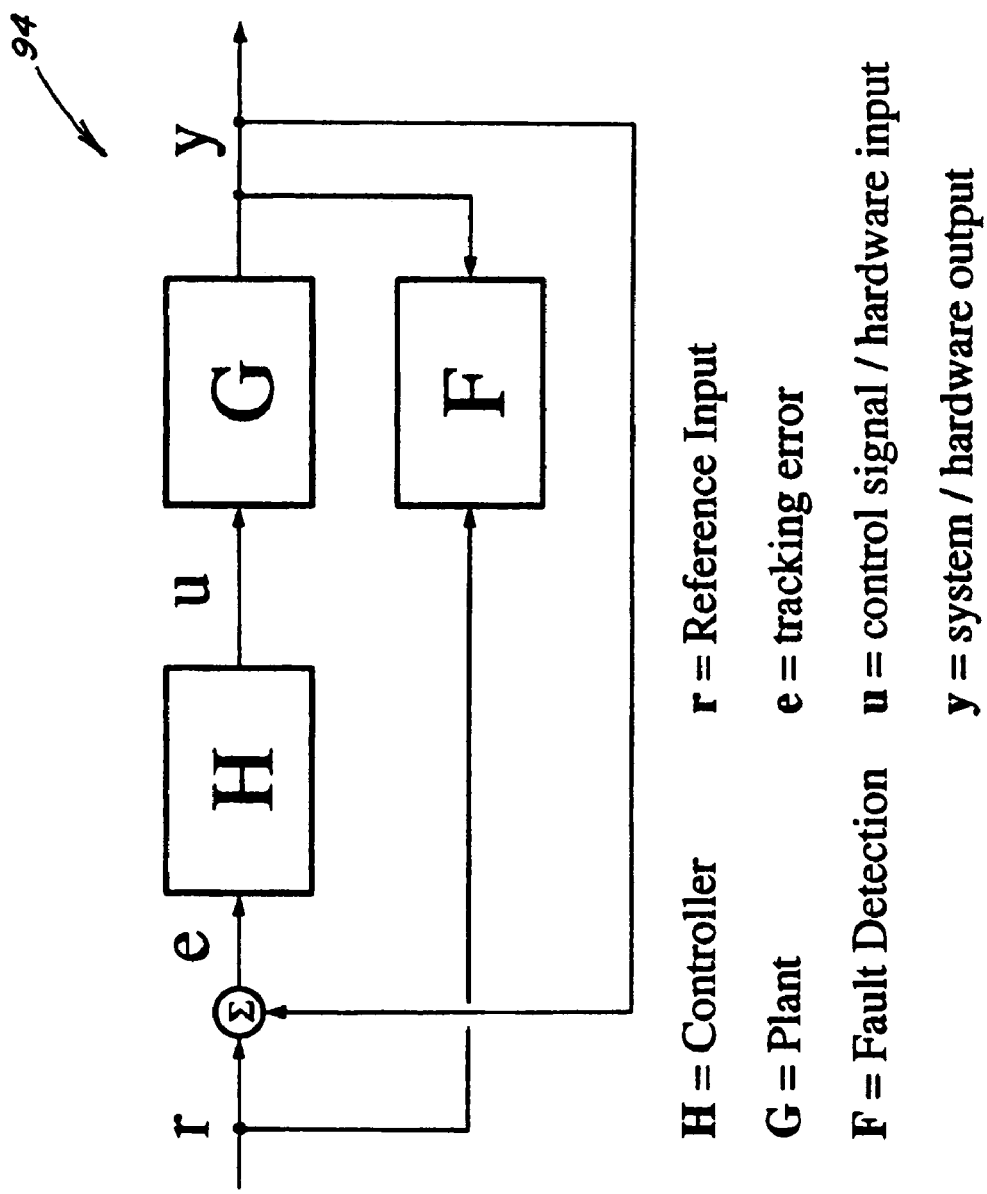
FIG. 7 is a diagram illustrating a control system of the propulsion driveline and fault detection system embodying a preferred method of the instant invention.

FIG. 7 includes a diagram 94 illustrating the flow of operator input commands and hardware outputs utilized in error monitoring and fault detection according to the invention. Essentially, reference input commands r (e.g., voltage inputted through the position of FNR lever 40 by potentiometer 42) is matched with responsive system/hardware outputs y (e.g., voltages outputted by potentiometers 62) to derive tracking errors e by control module 46 (Controller H). Tracking errors e are processed to determine any faults (Fault Detection F). This is preferably done using the following exponentially decaying integrator, also used for integration of current errors:

propulsion cylinder integrator=$\int e^{a(T-t)}*$(position error) $dT$, with limits of integration 0 to $t$.

electrical current integrator=$\int e^{a(T-t)}*$(current error)$dT$, with limits of integration 0 to $t$.

The integrals are approximated (using integer math) via the following formula: integral (k)=error(k)+[A*integral(k−1)] where 0<A<1=decay rate to give the algorithm a forgetting type property wherein the most recent error signals are weighted more heavily than ones further in the past. A predetermined threshold is set on this exponentially decaying integrator to indicate when the controlled system is no longer tracking sufficiently well. When the value of the exponentially decaying integrator exceeds the threshold, appropriate action is taken to preserve the integrity and safety of the system, which can include outputting of a fault signal to the operator, an automatic system shutdown, or the like.

Another algorithm for monitoring the controller stability checks bounds. When the system is overshooting (measured system output exceeds the desired output value) or undershooting (measured system output is less than the desired output value) it is checked to make sure that the measured output value isn't at a corresponding saturation limit of the hardware, which would be an indication that the controller has become unstable.

If there is a fault, solenoids A and B (FIG. 2) controlling the valve which directs hydraulic fluid to the chambers of propulsion cylinder 64 are de-energized, to allow the spring associated with Control module 46 can be programmed such that the FNR dv/dt monitoring and fault detection only reacts to faults that would cause rapid acceleration, therefore ignoring rapid deceleration commands. However, control module 46 can be programmed such that Propulsion Cylinder dv/dt monitoring reacts to acceleration and deceleration.

Control module 46 can additionally be programmed such that if FNR lever 40 is in a forward range, that is, it is moved in the direction for commanding the windrower to move forward, and is being moved towards neutral, and if the Propulsion Cylinder 64 is lagging behind the commanded position by more than a predetermined threshold, and driveline 22 is in high range, then a fault condition is determined, e.g., if the machine is sluggish to respond to an operator deceleration command, then the park brake is automatically applied.

Referring also to FIGS. 8-41, lines of code of an actual computer program embodying the above described steps of the method of the invention is disclosed. The notes accompanying the lines of code describe many features of the method of the invention. In the code, the FNR lever is identified as the MFH. Lines 1-118 initialize operation. Lines 119-248 monitor the exponentially decaying integrators of position and current tracking errors of propulsion cylinder 64 relative to commanded set points, including steps for the disablement of the propulsion system if the set points are exceeded. Lines 250-265 calculate the exponentially decaying integrator of absolute cylinder position tracking errors. Lines 266-283 calculate the exponentially decaying integrator of absolute valve current tracking errors.

Lines 284-345 look for rapid transitioning errors (MFH velocity and propulsion cylinder velocity exceeds limit) for both forward and reverse directions.

Lines 348-379 look at whether propulsion cylinder 64 is stuck at either of its forward and rearward extents. Lines 381-402 look for propulsion cylinder position verses MFH position mismatch.

Lines 1-1200 beginning in FIG. 16 provide steps, among other things, for calibrating MFH position commands with outputted control currents, for determining the reference values for tracking and set point error determination according to the invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. Apparatus for safeing a FNR lever movable for controlling a propulsion driveline of an agricultural windrower, comprising:

a FNR lever assembly including a FNR lever having a neutral position and movable in relation to the neutral position in a first direction and in a second direction opposite the first direction, and a sensor disposed and simultaneously operable for sensing positions of the FNR lever as the lever is moved in the first and second directions and outputting a signal representative thereof;

a propulsion cylinder assembly including a propulsion cylinder movable for effecting operation of the propulsion driveline, and two sensors configured and operable for sensing positions of the propulsion cylinder and outputting signals representative thereof, wherein the two sensors are configured such that sums of the signals representative of the positions of the propulsion cylinder outputted thereby are to equal a predetermined value;

a programmable control module in connection with the sensor of the FNR assembly for receiving the signals outputted thereby, the control module being connected in operative control of the propulsion cylinder and operable for outputting control signals thereto for causing movements thereof which track the signals representative of the positions of the FNR lever, the control module being programmed and operable for receiving and summing the signals outputted by the two sensors for sensing positions of the propulsion cylinder and comparing the sums to the predetermined value, and if any of the sums does not equal the predetermined value, then determining that a fault condition exists.

2. The apparatus of claim 1, wherein the signals are voltages and the predetermined value is 5 V.

3. The apparatus of claim 1, wherein the control module is programmed to disable the propulsion driveline responsive to a determination that a fault condition exists.

4. The apparatus of claim 1, wherein the control module is programmed to compare the signals representative of the positions of the propulsion cylinder to the signals representative of the positions of the FNR lever for determining existence of tracking errors therebetween.

5. The apparatus of claim 4, wherein the control module is programmed to integrate the tracking errors using an exponentially decaying integrator, and then to determine whether the integrals of the tracking errors exceed predetermined values therefor.

6. The apparatus of claim 4, wherein the control module is additionally programmed to monitor rates of change of values of the signals representative of the positions of the propulsion cylinder and rates of change of values of the signals representative of positions of the FNR lever, for determining if velocities of movements of the propulsion cylinder or the FNR lever exceed predetermined values or if the sensor signals are changing rapidly due to some other anomaly, and if yes, then determining that an error condition exists.

7. The apparatus of claim 6, wherein the control module is additionally programmed to compare rates of change of values of the signals representative of the positions of the propulsion cylinder as the cylinder moves from a full extent of movement thereof, to rates of change of values of the signals representative of positions of the FNR lever as the lever is moved from a position fully moved in the first or the second direction, for determining if the propulsion cylinder is sticking at the full extent of movement thereof.

8. A method for safeing a FNR lever movable for controlling a propulsion driveline of an agricultural windrower, comprising steps of:
   providing a FNR lever assembly including a FNR lever having a neutral position and movable in relation to the neutral position in a first direction and in a second direction opposite the first direction, and a sensor disposed and simultaneously operable for sensing positions of the FNR lever as the lever is moved in the first and second directions and outputting a signal representative thereof:
   providing a propulsion cylinder assembly including a propulsion cylinder movable for effecting operation of the propulsion driveline, and two sensors configured and operable for sensing positions of the propulsion cylinder and outputting signals representative thereof, wherein the two sensors are configured such that sums of the signals representative of the positions of the propulsion cylinder outputted thereby are to equal a predetermined value for any position of the propulsion cylinder;
   providing a programmable control module in connection with the sensor of the FNR assembly for receiving the signals outputted thereby, the control module being connected in operative control of the propulsion cylinder and operable for outputting control signals thereto for causing movements thereof which track the signals representative of the positions of the FNR lever, wherein the control module is programmed and operable for:
   receiving and summing the signals outputted by the two sensors for sensing positions of the propulsion cylinder;
   comparing the sums to the predetermined value, and
   if any of the sums does not equal the predetermined value, then determining that a fault condition exists.

9. The method of claim 8, wherein the signals are voltages and the predetermined value is 5 V.

10. The method of claim 8, comprising a further step of:
   disabling the propulsion driveline responsive to a determination that a fault condition exists.

11. A method for safeing a FNR lever movable for controlling a propulsion driveline of an agricultural windrower, comprising steps of:
   providing a FNR lever assembly including a FNR lever having a neutral position and movable in relation to the neutral position in a first direction and in a second direction opposite the first direction;
   providing at least one sensor disposed and operable for sensing positions of the FNR lever as the lever is moved in the first and second directions and outputting signals representative thereof;
   providing a programmable control module connected to the sensor and in operative control of a propulsion cylinder of the propulsion driveline and operable for outputting control signals thereto having electrical current values for causing movements of the propulsion cylinder which track the signals representative of the positions of the FNR lever;
   providing at least one sensor configured and operable for sensing positions of the propulsion cylinder and outputting signals representative thereof to the control module;
   and wherein the control module is programmed for performing steps of:
   comparing the signals representative of the positions of the propulsion cylinder to the signals representative of the positions of the FNR lever for determining any tracking errors therebetween;
   comparing the signals representative of the electrical current to the propulsion cylinder control solenoids to the command signals for the electrical current for determining any tracking errors therebetween;
   integrating the tracking errors using an exponentially decaying integrator, and then
   comparing the integrals of the tracking errors to predetermined values therefor, for both the electrical current and position; and
      if the integrals of the tracking errors are greater than the predetermined values therefore, then determining that a fault condition exists.

12. The method of claim 11, wherein the control module is programmed for automatically performing an additional step of:
   monitoring rates of change of values of the signals representative of the positions of the propulsion cylinder and to rates of change of values of the signals representative of positions of the FNR lever to determine if velocities of movements of the propulsion cylinder or the FNR lever exceed predetermined values or if the sensor signals are changing rapidly due to some other anomaly, and if yes, then determining that an error condition exists.

13. The method of claim 11, wherein the control module will perform an additional step of:
   comparing rates of change of values of the signals representative of the positions of the propulsion cylinder as the cylinder moves from a full extent of movement thereof, to rates of change of values of the signals representative of positions of the FNR lever as the lever is moved from a position fully moved in the first or the second direction, for determining if the propulsion cylinder is sticking at the full extent of movement thereof.

14. The method of claim 11, wherein the control module will perform additional steps of:
   providing two of the sensors disposed and operable for sensing positions of the propulsion cylinder and outputting signals representative thereof;
   summing the signals outputted by the two sensors; and
   comparing the sums to a predetermined value, and if any of the sums does not equal the predetermined value, then determining that a fault condition exists.

15. The method of claim 14, wherein the signals outputted by the two sensors comprise voltages and the predetermined value is 5 V.

16. The method of claim 14, wherein the control module will perform a step of:
   disabling the propulsion driveline responsive to a determination that a fault condition exists.

* * * * *